United States Patent
Moro et al.

(10) Patent No.: US 6,955,311 B2
(45) Date of Patent: Oct. 18, 2005

(54) SELF-PROPELLED RECYCLING MACHINE, AND BASE UNIT AND BASE FRAME OF SELF-PROPELLED RECYCLING MACHINE

(75) Inventors: Takashi Moro, Ushiku (JP); Takanao Hasebe, Ibaraki-ken (JP); Masamichi Tanaka, Tsuchiura (JP); Kazuhide Seki, Tsukuba (JP)

(73) Assignee: Hitachi Construction Machinery Co., Ltd., Tokyo (JP)

(*) Notice: Subject to any disclaimer, the term of this patent is extended or adjusted under 35 U.S.C. 154(b) by 165 days.

(21) Appl. No.: 10/432,670
(22) PCT Filed: Sep. 27, 2002
(86) PCT No.: PCT/JP02/10014
§ 371 (c)(1), (2), (4) Date: May 23, 2003
(87) PCT Pub. No.: WO03/028892
PCT Pub. Date: Apr. 10, 2003

(65) Prior Publication Data
US 2004/0035962 A1 Feb. 26, 2004

(30) Foreign Application Priority Data
Sep. 28, 2001 (JP) ........................................ 2001-304719

(51) Int. Cl.$^7$ ............................................. B02C 21/02
(52) U.S. Cl. ................ 241/101.741; 209/421; 241/101.8; 366/349; 366/606
(58) Field of Search ................... 366/606, 349, 366/131, 150.1, 184; 241/285.1, 101.741, 101.742, 101.8; 209/421

(56) References Cited

U.S. PATENT DOCUMENTS 4,084,751 A * 4/1978 Galis ........................... 241/25

FOREIGN PATENT DOCUMENTS

| JP | 9-195265 | 7/1997 |
| JP | 10-137624 | 5/1998 |
| JP | 11-28383 | 2/1999 |
| JP | 2000-128035 | 5/2000 |
| JP | 2000-264442 | 9/2000 |
| JP | 2001-121022 | 5/2001 |
| JP | 2001-254391 | 9/2001 |

* cited by examiner

*Primary Examiner*—Mark Rosenbaum
(74) *Attorney, Agent, or Firm*—Mattingly, Stanger, Malur & Brundidge, P.C.

(57) ABSTRACT

In a self-propelled recycling machine for receiving recyclable materials and processing the recyclable materials to produce recycled products, the self-propelled recycling machine comprises traveling units 2 disposed side by side in a spaced relation, a base frame 29 disposed between the traveling units 2 so as to form a space for accommodating a power unit 3 between the traveling units 2, the power unit 3 disposed in the space within the base frame 29, and a mixing apparatus 23 disposed on the base frame 29. With such a construction, flexibility in layout of various component units can be increased.

18 Claims, 31 Drawing Sheets

SELF-PROPELLED RECYCLING MACHINE, AND BASE UNIT AND BASE FRAME OF SELF-PROPELLED RECYCLING MACHINE

TECHNICAL FIELD

The present invention relates to a self-propelled recycling machine for receiving recyclable materials and processing the recyclable materials through predetermined steps to produce recycled products.

BACKGROUND ART

Recently, a tendency toward promotion of reuse of wastes has been increased with enforcement (October, 1991) of the Resource Reproduction Promotion Act (so-called Recycle Act). Under such a situation, there have expanded needs for self-propelled recycling machine represented by, e.g., a self-propelled crushing machine for receiving, as recyclable materials, materials to be crushed, e.g., rocks and building or housing wastes generated in construction sites and industrial wastes, and crushing those materials into predetermined sizes to obtain recycled products (crushed fragment products), and a self-propelled soil modifying machine for receiving, as recyclable materials, earth, etc. generated in various construction and other sites, and mixing a hardener (soil modifier) to the earth to obtain recycled products (modified earth products).

For example, many types of self-propelled crushing machines have already been proposed, including a machine equipped with, as a processing apparatus, a 2-axis shearing machine (so-called shredder) as disclosed in JP, A 10-137624, and a machine equipped with, as a processing apparatus, the so-called jaw crusher as disclosed in JP, A 11-28383. Also, many types of self-propelled soil modifying machines have already been proposed, including a machine equipped with, as a processing apparatus, a mixing apparatus as disclosed in, e.g., JP, A 9-195265. In any of those prior-art machines, the processing apparatus is mounted on a body frame, processes the recyclable materials received by a receiving section (hopper) through predetermined steps, and then delivers recycled products to the outside of the machine through a delivery conveyor vertically extending to rise from a position below the body frame.

DISCLOSURE OF THE INVENTION

In many of such self-propelled recycling machines, a power unit (mover unit) serving as a driving source for various component units, e.g., the processing apparatus and traveling units, is usually mounted on the body frame at one end in the longitudinal direction thereof. Taking into account a total weight balance of the machine in, e.g., self-propelled traveling and processing works, therefore, positions in which the various component units, such as the processing apparatus, are to be arranged are necessarily essentially limited to particular locations on the body frame, and layout of the various component units is greatly restricted in the whole of the machine.

An object of the present invention is to provide a self-propelled recycling machine, which can increase flexibility in layout of various component units.

(1) To achieve the above object, the present invention provides a self-propelled recycling machine for receiving recyclable materials and processing the recyclable materials to produce recycled products, the self-propelled recycling machine comprising a base frame having a space therein; traveling units disposed on both sides of the base frame; a power unit accommodated in the space within the base frame; and a processing apparatus disposed on the base frame.

With the self-propelled recycling machine of the present invention, an accommodation space is formed between the traveling units disposed side by side in a spaced relation, and the base frame containing the power unit therein is disposed in the accommodation space, whereby the power unit, which has been disposed on a body frame in the past, is disposed between the traveling units. Accordingly, a wide space can be surely left on the base frame, and stability of the machine as a whole can be drastically improved. As a result, comparing with the conventional structure in which the body frame is disposed on the traveling units and the power unit is arranged in one side of the body frame in the longitudinal direction thereof, flexibility in layout of various component units can be greatly increased.

(2) To achieve the above object, the present invention also provides a self-propelled recycling machine for receiving recyclable materials and processing the recyclable materials to produce recycled products, the self-propelled recycling machine comprising a base frame made up of a first member having a space therein and second members disposed at an upper end of the first member on both sides to extend substantially horizontally; traveling units disposed on both sides of the first member and positioned under the second members; a power unit accommodated in the space within the first member; and a processing apparatus disposed on the base frame.

(3) In above (1) or (2), preferably, the power unit comprises an engine, a fuel tank for the engine, a hydraulic fluid tank, a hydraulic pump driven by the engine, and a radiator for cooling the engine.

(4) In above (3), preferably, the engine, the fuel tank, the hydraulic fluid tank, the hydraulic pump, and the radiator are disposed between the traveling units substantially over an entire length in the longitudinal direction thereof.

(5) In above (3), preferably, the engine, the hydraulic pump, and the radiator are disposed between the traveling units on one side in the longitudinal direction thereof in concentrated layout.

(6) In above (4) or (5), preferably, the self-propelled recycling machine further comprises a receiving section receiving the recyclable materials and disposed above the other side of the base frame in the longitudinal direction thereof, and transfer/delivery means extended toward one side of the base frame in the longitudinal direction thereof.

(7) In above (6), preferably, the transfer/delivery means has a delivery side end positioned at a level higher than the receiving section.

(8) In any one of above (1) to (7), preferably, the processing apparatus is a mixing apparatus for mixing the recyclable materials.

(9) In above (8), preferably, a transport conveyor for supplying the recyclable materials to the mixing apparatus and a hardener supplying apparatus for supplying a hardener to the recyclable materials are further disposed on the base frame.

(10) In above (9), more preferably, amount-of-dispensed-material adjusting means for adjusting an amount of the recyclable materials dispensed to be transported by the transfer/delivery means is disposed above the transfer/delivery means.

(11) In any one of above (1) to (7), preferably, the processing apparatus is a sieving apparatus for sorting the recyclable materials depending on grain sizes.

(12) In any one of above (1) to (7), preferably, the processing apparatus comprises a compressive kneading apparatus for compressing and kneading the recyclable materials, and a disintegrating apparatus for shearing the recyclable materials having been compressed and kneaded by the compressive kneading apparatus.

(13) In any one of above (1) to (7), preferably, the processing apparatus is a crushing apparatus for crushing the recyclable materials.

(14) Further, to achieve the above object, the present invention provides a base unit for a self-propelled recycling machine for receiving recyclable materials and processing the recyclable materials to produce recycled products, the base unit comprising a base frame having a space therein; traveling units disposed on both sides of the base frame; and a power unit accommodated in the space within the base frame.

(15) Still further, to achieve the above object, the present invention provides a base frame for a self-propelled recycling machine for receiving recyclable materials and processing the recyclable materials to produce recycled products, wherein the base frame has a space formed therein for accommodating a power unit between traveling units.

BEST MODE FOR CARRYING OUT THE INVENTION

One embodiment of a self-propelled recycling machine of the present invention will be described below with reference to the drawings. In this embodiment, the self-propelled recycling machine is described, taking as an example a self-propelled soil modifying machine for receiving, as recyclable materials, earth and sand to be modified, mixing the received earth and sand together with a hardener, and then delivering the modified earth as recycled products.

Figure 1:
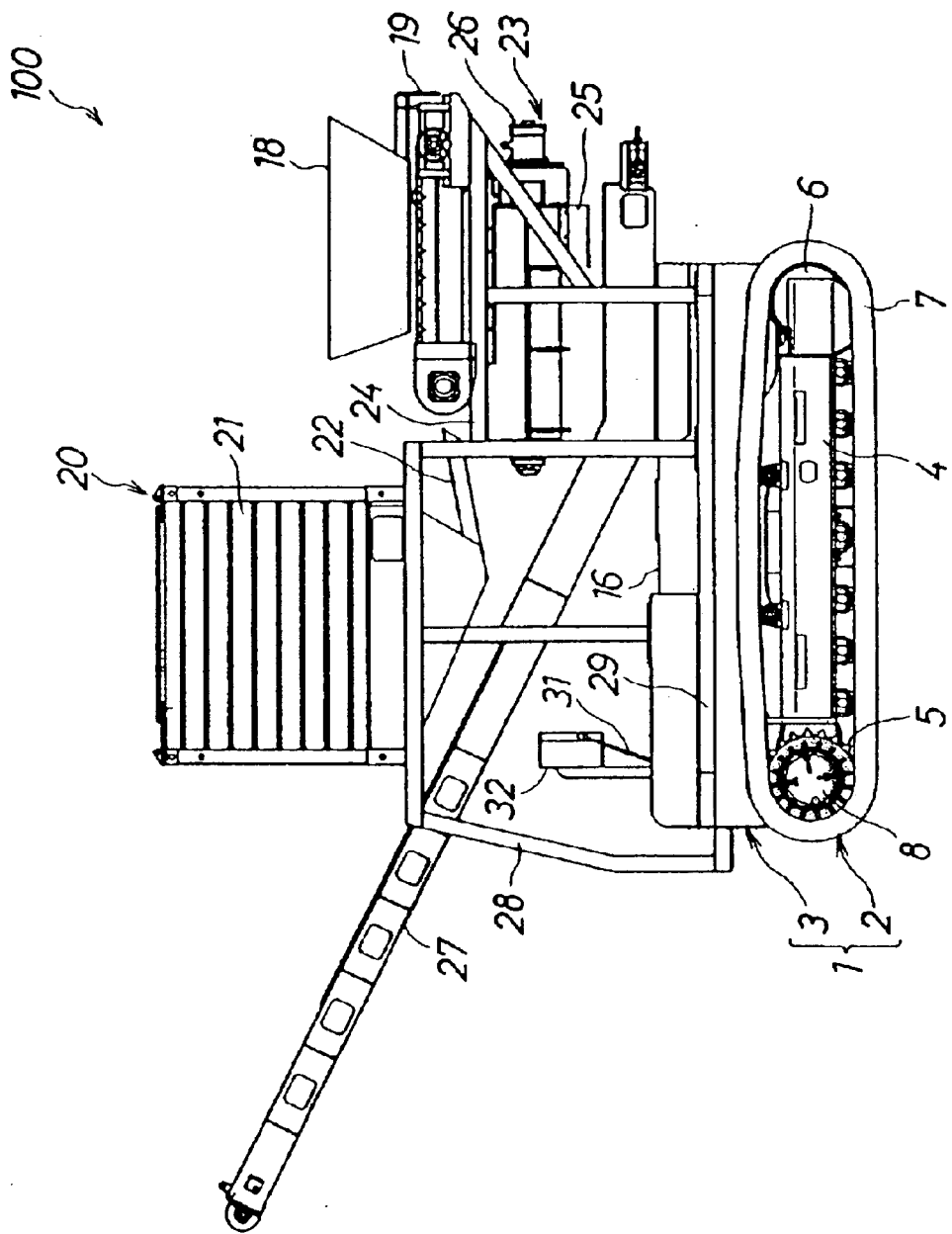
FIG. 1 is a side view showing an overall structure of one embodiment of a self-propelled recycling machine of the present invention.
Figure 2:
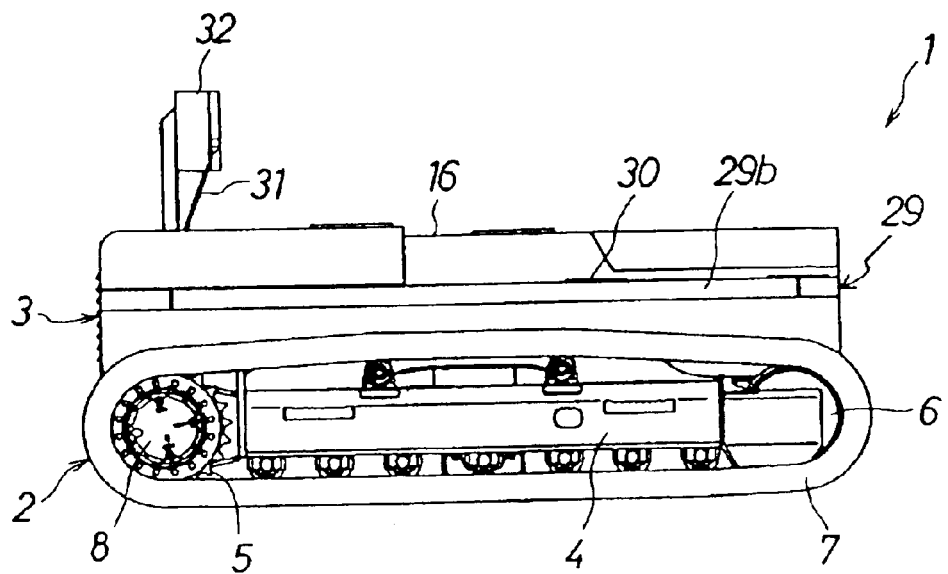
FIG. 2 is a side view showing an external structure of a base unit equipped in one embodiment of the self-propelled recycling machine of the present invention.
Figure 3:
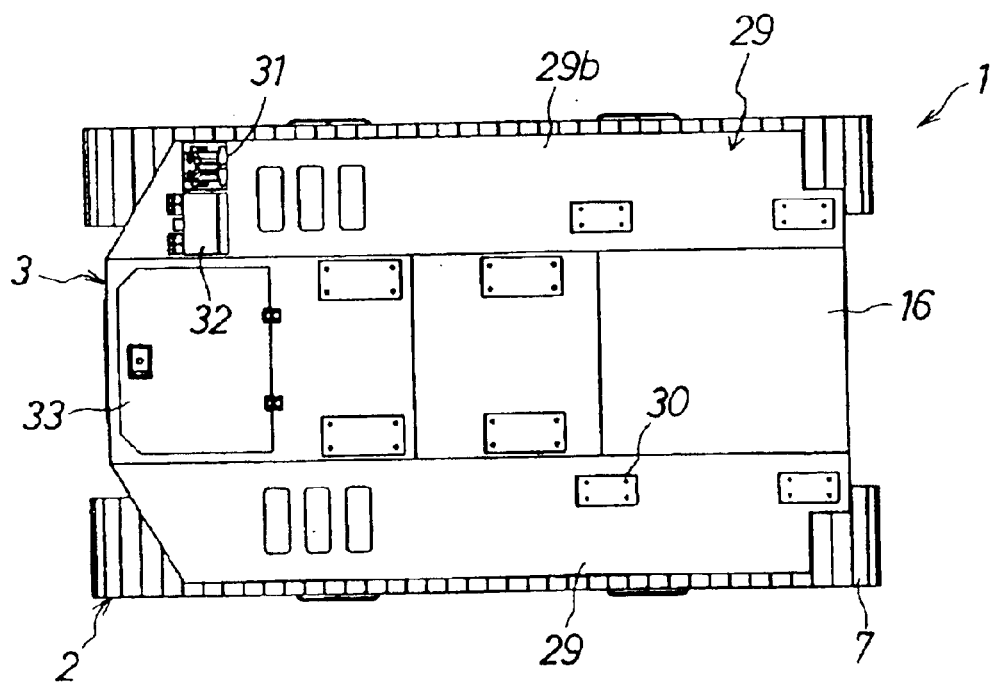
FIG. 3 is a plan view showing the external structure of the base unit equipped in one embodiment of the self-propelled recycling machine of the present invention.

FIG. 1 is a side view showing an overall structure of one embodiment of a self-propelled recycling machine of the present invention, FIG. 2 is a side view showing an external structure of a base unit equipped in one embodiment of the self-propelled recycling machine of the present invention, and FIG. 3 is a plan view showing the external structure of the base unit.

In FIGS. 1 to 3, reference numeral 1 denotes a base unit. The base unit 1 comprises a pair of traveling units 2 disposed side by side in a spaced relation on the left and right, a power unit 3 (mover unit) serving as a power source for the self-propelled soil modifying machine, and a base frame 29 disposed between the pair of traveling units 2 so as to form a space for accommodating the power unit 3 between the pair of traveling units 2. Each of the traveling units 2 comprises a track frame 4 projecting from a lower portion of the base frame 29 on each of both sides thereof in the widthwise direction (up-and-down direction as viewed in FIG. 3), a driver wheel 5 and a driven wheel (idler) 6 disposed respectively at opposite ends of the track frame 4, a crawler (endless track crawler) 7 running round the driver wheel 5 and the driven wheel 6, and a driving device 8 directly coupled to the driver wheel 5.

Figure 4:
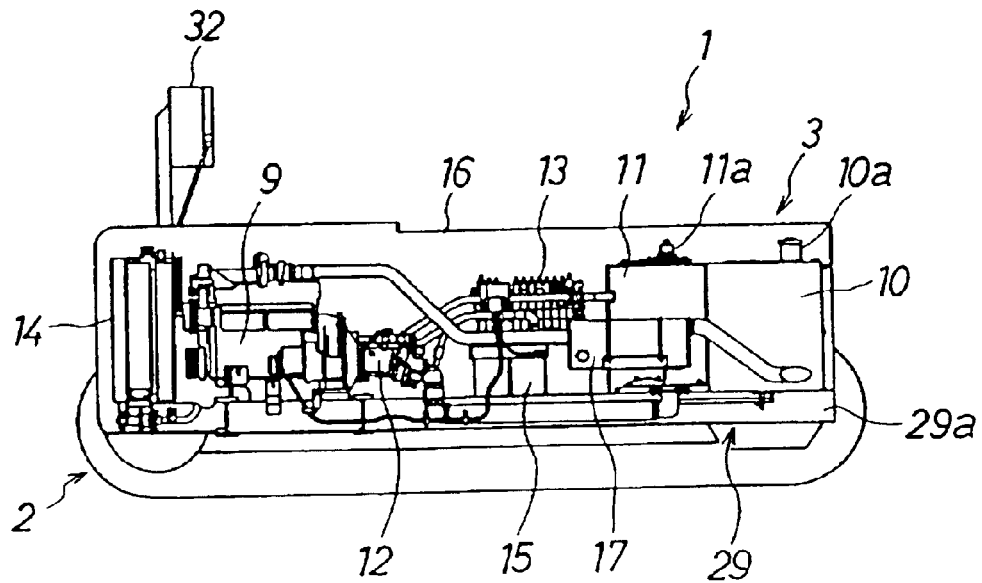
FIG. 4 is an internal side view showing a detailed structure of a power unit equipped in one embodiment of the self-propelled recycling machine of the present invention.
Figure 5:
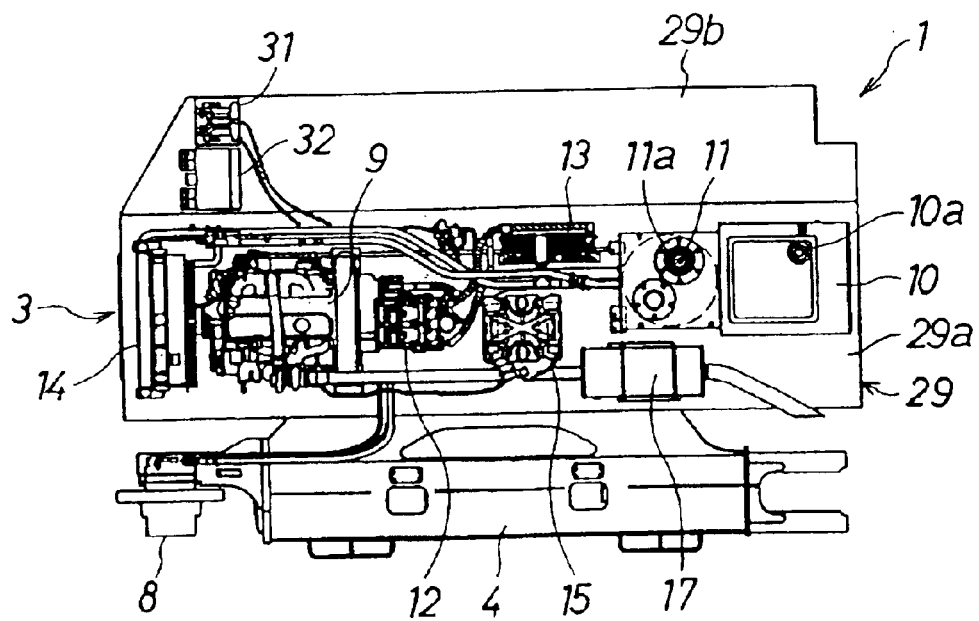
FIG. 5 is an internal plan view showing the detailed structure of the power unit equipped in one embodiment of the self-propelled recycling machine of the present invention.
Figure 6:
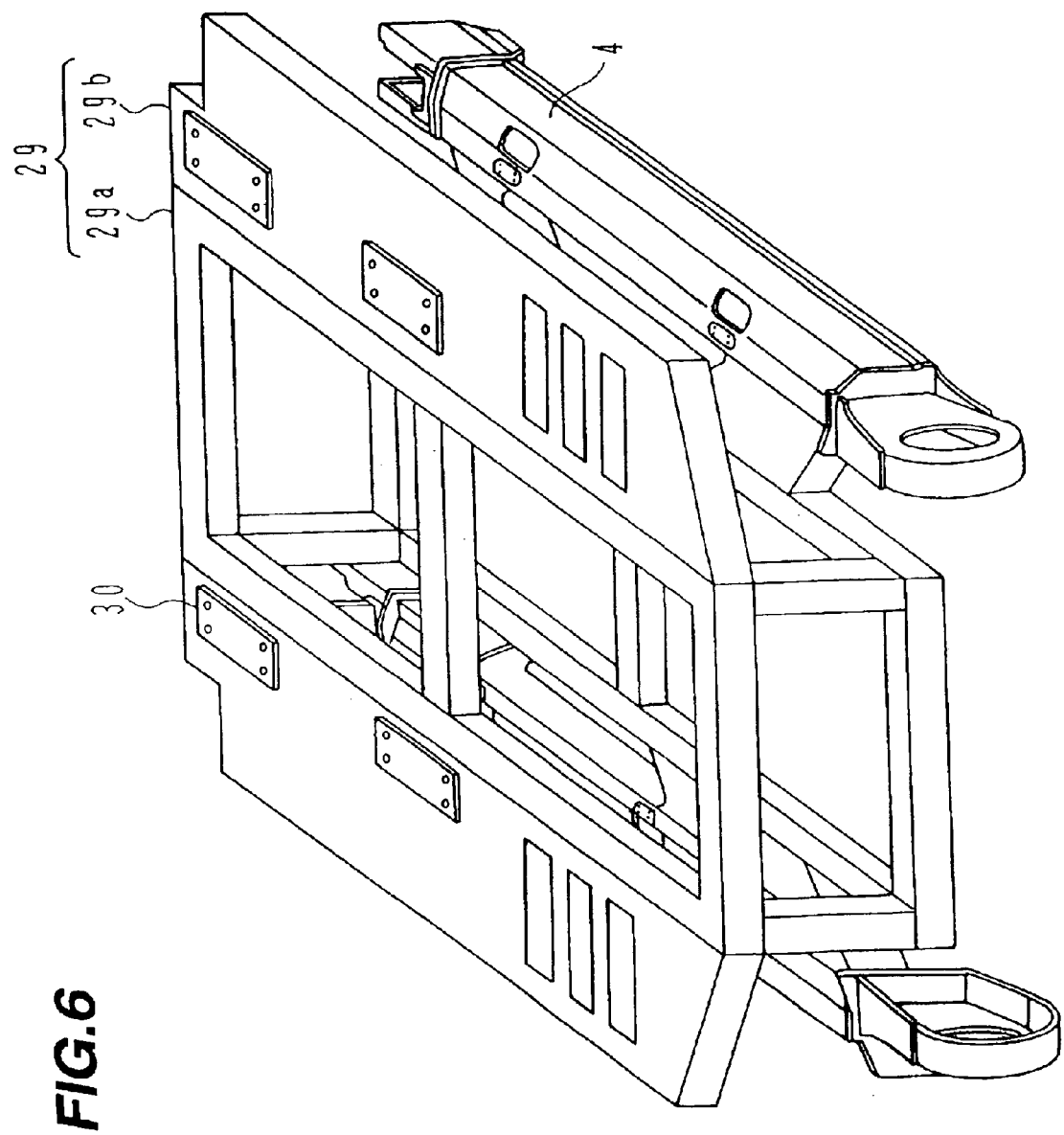
FIG. 6 is a perspective view showing a detailed structure of a base frame equipped in one embodiment of the self-propelled recycling machine of the present invention.

FIG. 4 is an internal side view showing a detailed structure of the base unit 1, FIG. 5 is an internal plan view showing the detailed structure of the based unit 1, and FIG. 6 is a perspective view showing a detailed structure of the base frame 29.

As shown in FIGS. 4 to 6 in addition to FIGS. 2 and 3, the base frame 29 comprises a first member 29a having substantially box-like shape and disposed between the pair of traveling units 2 so as to form a space for accommodating the power unit 3 between the pair of traveling units 2, and second members 29b disposed to extend from an upper end of the first member 29a so as to lie over the traveling units 2.

Figure 7:
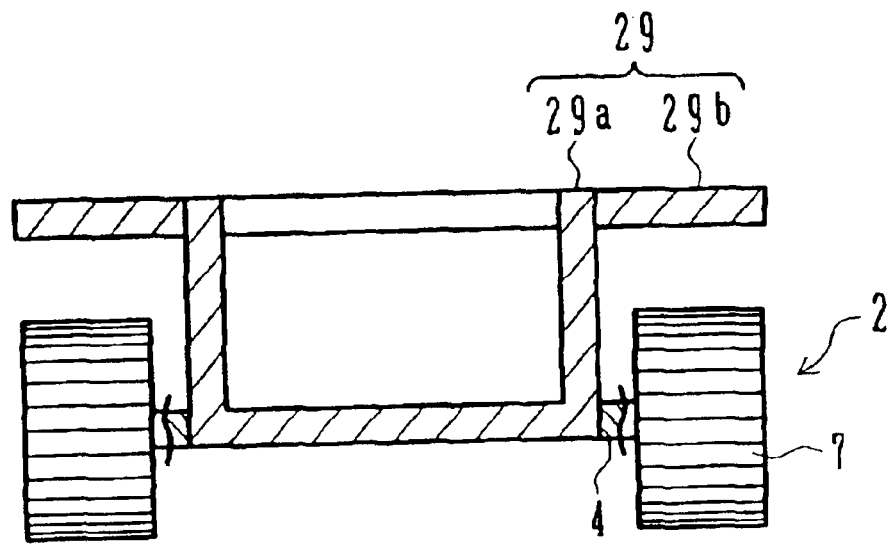
FIG. 7 is a sectional view showing a widthwise section of one construction example of the base frame equipped in one embodiment of the self-propelled recycling machine of the present invention.
Figure 8:
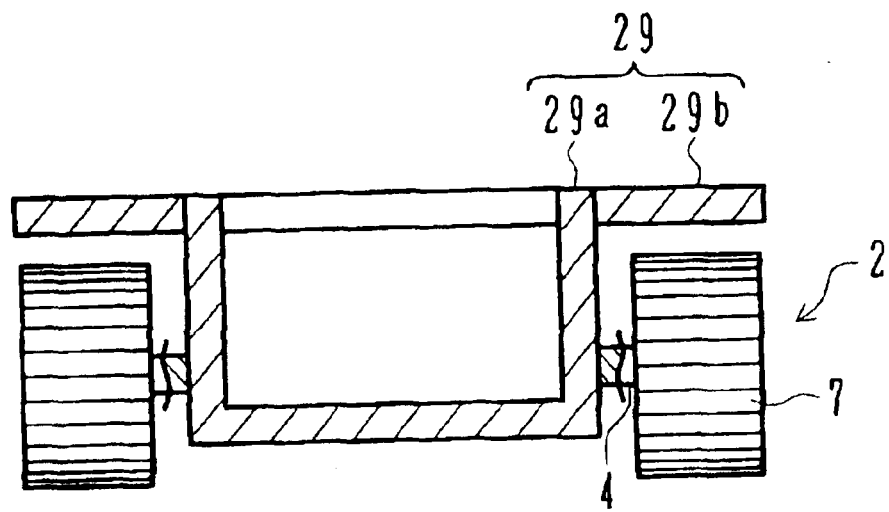
FIG. 8 is a sectional view showing a widthwise section of another construction example of the base frame equipped in one embodiment of the self-propelled recycling machine of the present invention.

FIGS. 7 and 8 are sectional views showing respective widthwise sections of one construction example and another construction example of the base frame 29. In the drawings mentioned above, as shown in one construction example of FIG. 7, the track frame 4 of the traveling unit 2 is attached by, e.g., welding to a side of the first member 29a of the base frame 29 at its lower end portion (see FIG. 6). However, the construction of the base frame 29 is not limited to the above-described one. As shown in another construction example of FIG. 8, for instance, the track frame 4 may be disposed in a position displaced upward from a lower end of the first member 29a such that the crawler 7 comes closer to the underside of the first member 29a with an appropriate clearance left between them to such an extent as not contacting with the second member 29b of the base frame 29.

While the first member 29a is illustrated in FIG. 6 in the form of a frame assembled by steel materials, e.g., square pipes, four side surfaces and a bottom surface of the frame assembly may be covered with plate-like members to provide a box-like structure, thereby forming the space to accommodate the power unit 3. Also, the frame shape is of course not limited to one shown in FIG. 6. So long as it is ensured that the frame assembly has an internal volume enough to accommodate the power unit 3, etc. therein, the frame shape can be changed as a matter of design as desired. Further, the provision of beams or the likes from the structural point of view is restricted in no way so long as those members are disposed to provide a desired level of strength. Of course, those members may be omitted when a desired level of strength is ensured without the provision of those members.

Figure 9:
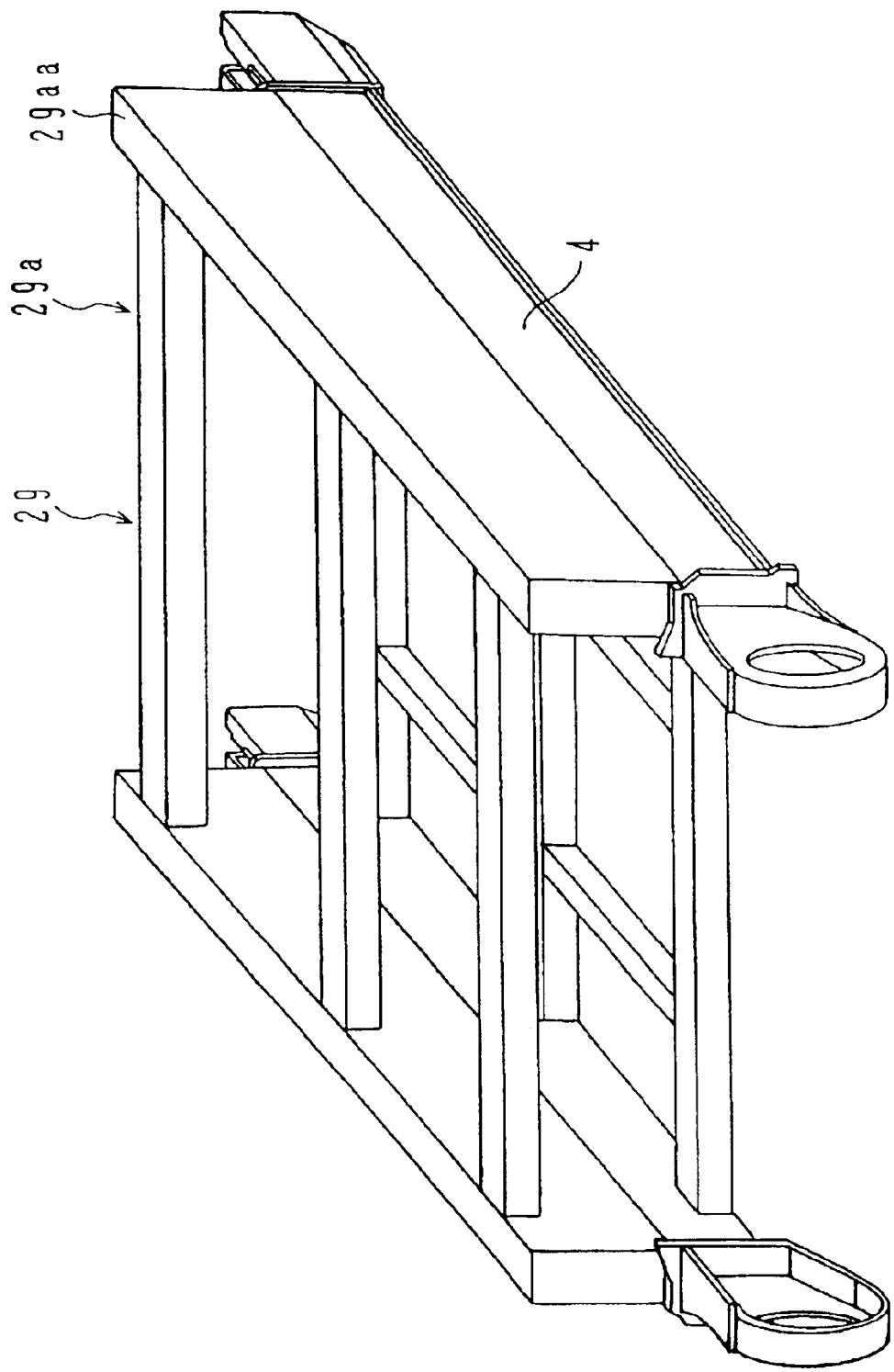
FIG. 9 is a perspective view showing another construction example of the base unit 1 equipped in one embodiment of the self-propelled recycling machine of the present invention.

Also, the structure of the base frame 1 itself is not limited to one shown in FIG. 6. The track frames 4 of the traveling units 2 may be integrally assembled to both sides of the first member 29a of the base frame 29. More specifically, as shown in FIG. 9, by way of example, as another construction example of the base unit 1, the first member 29a is constituted by employing the track frames 4 as lower frames of the first member 29a at both the sides thereof, forming both side portions of the first member 29a by the track frames 4 and plate-like frames 29aa disposed on the track frames 4, and connecting both the side portions of the first member 29a to each other as appropriate using beams or the likes. As still another construction, the first member may be assembled to the form of a frame in almost the same manner as that shown in FIG. 6, and portions of the track frames 4 supporting the driver wheels 5 and the driven wheels 6 may be attached respectively to front and rear portions of the first member at both the sides thereof. While the second members 29b are not shown in FIG. 9 for the sake of simplicity, the second members 29b are actually disposed to extend from the upper end of the first member 29a on both the sides thereof and connected to each other by, e.g., welding or bolting.

Returning to FIGS. 4 and 5, the construction of the power unit 3 will be described in the following. Reference numeral 9 denotes an engine serving as a driving source of the self-propelled soil modifying machine of this embodiment, 10 denotes a fuel tank for the engine 9, and 11 denotes a hydraulic fluid tank for storing a hydraulic fluid supplied to various hydraulic actuators, such as the driving device 8. Fluid supply ports 10a, 11a are provided respectively in the fuel tank 10 and the hydraulic fluid tank 11. Reference numeral 12 denotes a hydraulic pump driven by the engine 9 and delivering the hydraulic fluid from the hydraulic fluid tank 11, and 13 denotes a control valve device provided with a plurality of control valves each controlling the direction and flow rate (or only the direction) of the hydraulic fluid delivered from the hydraulic pump 12. Reference numeral 14 denotes a radiator for cooling the engine 9, 15 denotes a battery, and 17 denotes an exhaust muffler for muffling of exhaust gas from the engine 9.

Also, reference numeral 16 denotes a cover for covering the space formed in the base frame 29 to accommodate the power unit 3. As shown in FIGS. 4 and 5, the various components constituting the power unit 3, i.e., the engine 9, the fuel tank 10, the hydraulic fluid tank 11, the hydraulic pump 12, the control valve device 13, the radiator 14, the battery 15, the exhaust muffler 17, etc. which constitute the power unit 3, are disposed within the base frame 29 and the cover 16 between the pair of traveling units 2 substantially over the entire length of the base frame 29 in the longitudinal direction (left-and-right direction as viewed in FIG. 4).

Further, though not specifically shown for the sake of simplicity, the power unit 3 includes a fan. When the engine 9 is started up, the fan is driven together with the hydraulic pump 12 to suck open air into the power unit 3 through an intake port (not shown), thereby cooling the radiator 14, the engine 9, the hydraulic pump 12, the muffler 17, etc. The air is then released to the atmosphere through an exhaust port (not shown). The engine 9 and the exhaust muffler 17 are connected to each other through an exhaust manifold. The exhaust gas from the engine 9 flows into the exhaust muffler 17 through the exhaust manifold for the purpose of muffling, following which the exhaust gas is released to the atmosphere. Additionally, the power unit 3 is provided with an air cleaner (not shown) for cleaning the intake air introduced to the engine 9.

Returning to FIGS. 1 to 3, reference numeral 18 denotes a receiving section (hopper) for receiving earth and sand, as recyclable materials, loaded by a hydraulic excavator, for example. The receiving section 18 is formed substantially in a frame shape spreading upward and is positioned above the base unit 1 on the other side (right side in FIG. 1) in the longitudinal direction thereof. Reference numeral 19 denotes a transport conveyor for transporting the earth and sand within the receiving section 18, and 20 denotes a hardener supplying apparatus for adding a hardener (soil modifier) to the earth and sand on the transport conveyor 19. The hardener supplying apparatus 20 comprises a hardener reservoir 21 and a hardener feeder 22 (e.g., a screw feeder or a rotary feeder) disposed below the hardener reservoir 21.

Reference numeral 23 denotes a mixing apparatus as a processing apparatus equipped in a self-propelled recycling machine (self-propelled soil modifying machine) 100 of this embodiment. The mixing apparatus 23 includes a paddle mixer (not shown) disposed therein. The earth and sand introduced, along with the hardener, from the transport conveyor 19 and the hardener supplying apparatus 20 through an inlet 24 are mixed with each other by the paddle mixer to produce modified earth, which is then delivered through an outlet 25. Reference numeral 26 denotes a driving device for driving the paddle mixer for rotation.

Reference numeral 27 denotes a transfer/delivery means (delivery conveyor) for delivering the modified earth, which has been produced by the mixing apparatus 23, to the outside of the machine. The transfer/delivery means 27 is extended from a position under the outlet 25 of the mixing apparatus 23 toward the one end side of the base unit 1 in the longitudinal direction thereof (to the left in FIG. 1). Then, the transfer/delivery means 27 is inclined upward as it extends in the feed direction (to the left in FIG. 1), and has a delivery side end (on the left side in FIG. 1) positioned at a level higher than the receiving section 18.

Reference numeral 28 denotes a support frame assembled as appropriate using steel materials, e.g., square pipes. The above-mentioned various component units, such as the receiving section 18, the transport conveyor 19, the hardener supplying apparatus 20, the mixing apparatus 23, and the transfer/delivery means 27, are supported by the support frame 28 and disposed as an integral structure on the base unit 1.

Reference numeral 30 denotes a plurality of mount portions provided as appropriate on upper surfaces of the base frame 29 (exactly speaking, the second members 29b) and the cover 16. The support frame 28 are mounted to the mount portions 30 using, e.g., bolts. The mount portions 30 are each formed of, for example, a steel plate in which a plurality of screw holes are bored, and they are fixed to the cover 16 and the base frame 29 as appropriate by, e.g., welding. In other words, even when the support frame 28 has somewhat different constructions depending on the layout of the various component units such as the mixing apparatus 23, each support frame 28 can be fixed in appropriate positions corresponding to the shape of the support frame 28.

Reference numeral 31 denotes a control lever for the traveling units 2, and 32 denotes a control panel for the various component units, such as the transport conveyor 19, the hardener supplying apparatus 20, the mixing apparatus 23, and the transfer/delivery means 27. Reference numeral 33 denotes an inspection opening (see FIG. 3) formed in the cover 16 of the power unit 3 for the purpose of maintenance of the engine 9 and the peripheral components around it.

In the self-propelled soil modifying machine 100 thus constructed, when earth and sand to be modified are loaded into the hopper 18 by a hydraulic excavator, for example, the earth and sand received into the hopper 18 are fed by the transport conveyor 19 disposed below the hopper 18 and introduced to the mixing apparatus 23 together with the hardener from the hardener supplying apparatus 20. The earth and sand introduced, along with the hardener, to the mixing apparatus 23 are evenly agitated and mixed by the paddle mixer, and then delivered as modified earth onto the transfer/delivery means 27. Subsequently, the modified earth is transported by the transfer/delivery means 27 and delivered to the outside of the machine (to the left in this embodiment as shown in FIG. 1).

In many of conventional similar self-propelled recycling machines including a self-propelled soil modifying machine, a power unit (mover unit) serving as a driving source for various component units, e.g., a processing apparatus (corresponding to the mixing apparatus 23 in this embodiment) and traveling units, is mounted on a body frame at one end in the longitudinal direction thereof. Taking into account a total weight balance of the machine in, e.g., self-propelled traveling and processing works, therefore, positions in which the various component units, such as the processing apparatus, are to be arranged are necessarily essentially limited to particular locations on the body frame, and layout of the various component units is greatly restricted in the whole of the machine.

By contrast, in this embodiment, an accommodation space is formed between the pair of traveling units 2 disposed side by side in a spaced relation, and the base frame 29 containing the power unit 3 therein is disposed in the accommodation space, whereby the power unit 3, which has been disposed on the body frame in the past, is disposed between the pair of traveling units 2. Accordingly, a wide space can be surely left on the base frame 29. Further, since the center of gravity of the machine is lowered, stability is not impaired even when the layout of the various mounted component units is changed to some extent, and hence stability of the machine as a whole can be drastically improved. As a result, comparing with the conventional structure in which the body frame is disposed on the traveling units and the power unit is arranged in one side of the body frame in the longitudinal direction thereof, flexibility in layout of the various component units can be greatly increased. In addition, by attaching the track frames 4 for the traveling units 2 to the first member 29a of the base frame 29 at a position as high as possible from the lower end of the first member 29a within an allowable range, as shown in FIG. 8, the center of gravity of the base unit 1 is further lowered, whereby a more satisfactory advantage can be obtained with increased stability.

While the base frame 29 is constructed by the first member 29a and the second members 29b in this embodiment, the present invention is not always limited to such a construction. For example, the base unit 1 may be constructed by simply providing a plate between the pair of traveling units 2 (more specifically between the pair of track frames 4), and mounting the power unit 3 on the plate so as to position between the pair of traveling units 2. In other words, it is not necessarily required to assemble the first and second members 29a, 29b into the integral structure like this embodiment. It is just required to assemble a frame allowing the power unit 3 to be disposed between the pair of traveling units 2 and enabling the various component units to be mounted in appropriate layout above the frame.

Even in different types of self-propelled recycling machines, such as a self-propelled soil modifying machine and a self-propelled crushing machine, basic structures of general equipment, such as tracking units and a power unit, are generally almost the same except other various component units mounted on a body frame. In manufacturing various types of self-propelled recycling machines, therefore, the tracking units and the power unit can be preferably employed in common by the various types of self-propelled recycling machines.

In practice, however, to ensure a total weight balance of the machine for each of the various types of self-propelled recycling machines, including the various component units mounted thereon, the position of the power unit must be displaced to some extent in the longitudinal direction of the body frame depending on the layout of the various component units, examine before deciding sufficiently. Stated otherwise, when manufacturing self-propelled recycling machines in the past, the layout design of the entire machine had to be made for each of the various types of self-propelled recycling machines. Further, a dedicated body frame for supporting the various component units and the power unit was required, and it was difficult to the tracking units and the power unit in common among the various types of self-propelled recycling machine while maintaining those units in the same positional relationship.

By contrast, in this embodiment, since the power unit 3 is disposed between the pair of traveling units 2 substantially over the entire length in the longitudinal direction thereof, the center of gravity of the power unit 3 is positioned at a lower level and the power unit 3 can be arranged substantially at the center of the base unit 1. Therefore, the weight balance can be drastically improved in comparison with the conventional case of providing the body frame above the tracking units and mounting the power unit in one side of the body frame in the longitudinal direction thereof. Also, even when the center of gravity of the various component units mounted on the base unit 1 is displaced from the center of the base unit 1 to some extent as a whole, satisfactory stability can be ensured in self-propelled traveling and processing work. It is hence possible to handle the various component units mounted on the base unit 1, as optionally attachable units (attachments), while employing the base unit 1 as a common base structure. Consequently, the manufacturing costs of the various types of self-propelled recycling machine can be reduced. Furthermore, for example, in sites requiring the various types of self-propelled recycling machines, there is no longer need of replacing or purchasing the various types of machines themselves, and hence economical burdens imposed on end users, rental companies, etc. can be reduced.

Various types of self-propelled recycling machines, each of which is constructed using the base unit 1 equipped in one embodiment of the self-propelled recycling machine of the present invention, will be described below one by one with reference to FIGS. 10 to 20.

Figure 10:
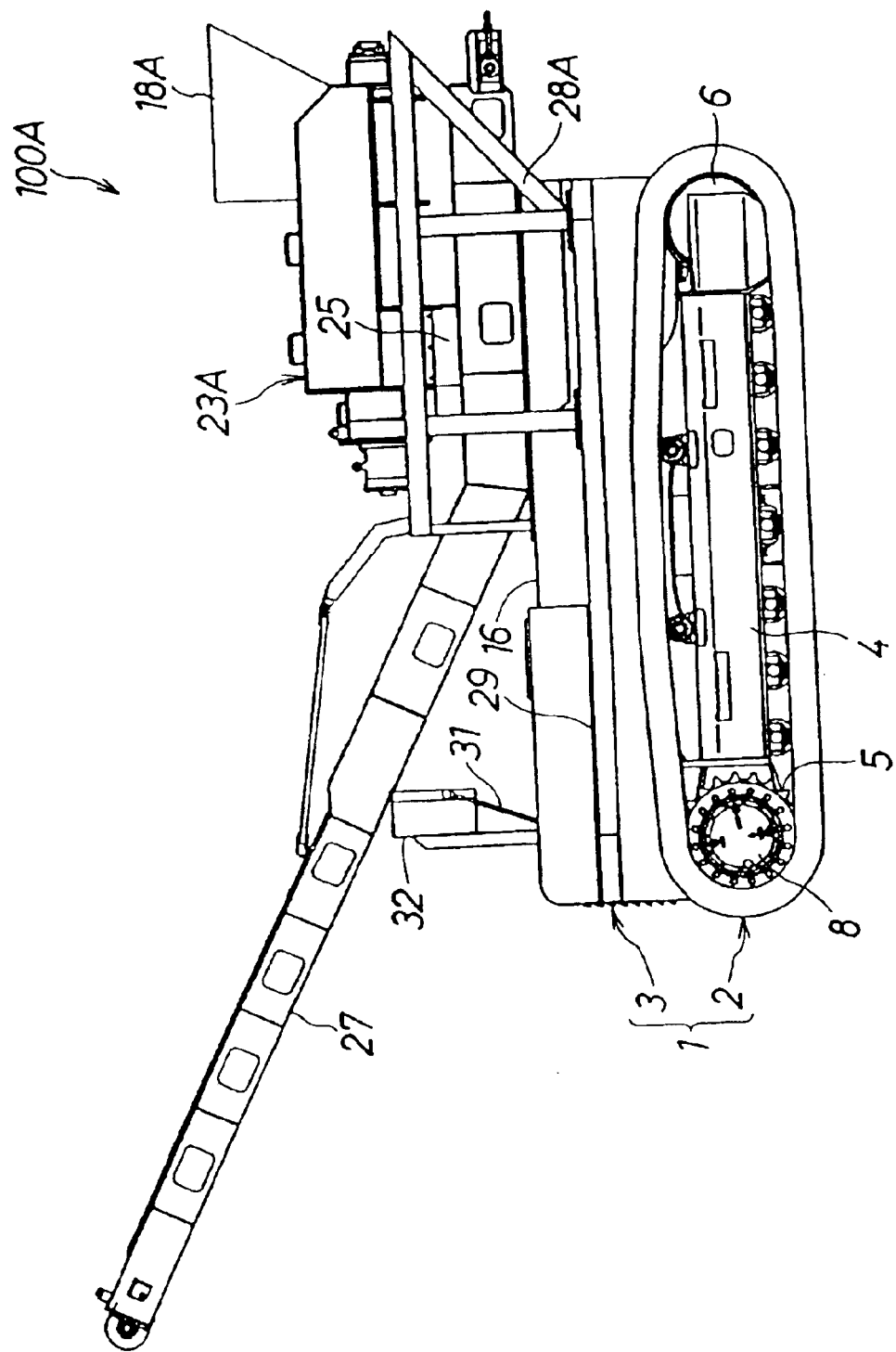
FIG. 10 is a side view showing an overall construction of one self-propelled mixing machine, which is constructed using the base unit equipped in one embodiment of the self-propelled recycling machine of the present invention.

FIG. 10 is a side view showing an overall construction of one self-propelled mixing machine, which is constructed using the base unit 1 equipped in one embodiment of the self-propelled recycling machine of the present invention. Note that similar components in FIG. 10 to those in FIG. 1 are denoted by the same reference numerals and a description thereof is omitted here.

In FIG. 10, reference numeral 23A denotes a mixing apparatus substantially similar to the mixing apparatus 23 described above. The mixing apparatus 23A agitates and mixes the received recyclable materials by a paddle mixer (not shown) installed therein. Reference numeral 18A denotes a section for receiving the loaded recyclable materials. The receiving section 18A serves also as an inlet of the mixing apparatus 23A. Thus, in a self-propelled mixing machine 100A of FIG. 10, the transfer/delivery means 27 and the mixing apparatus 23A supported by a support frame 28A are provided as attachments on the base unit 1. In the self-propelled mixing machine 100A, the loaded recyclable materials are introduced to the mixing apparatus 23A through the receiving section 18A, agitated by the paddle mixer, and then delivered to the outside of the machine by the transfer/delivery means 27.

Figure 11:
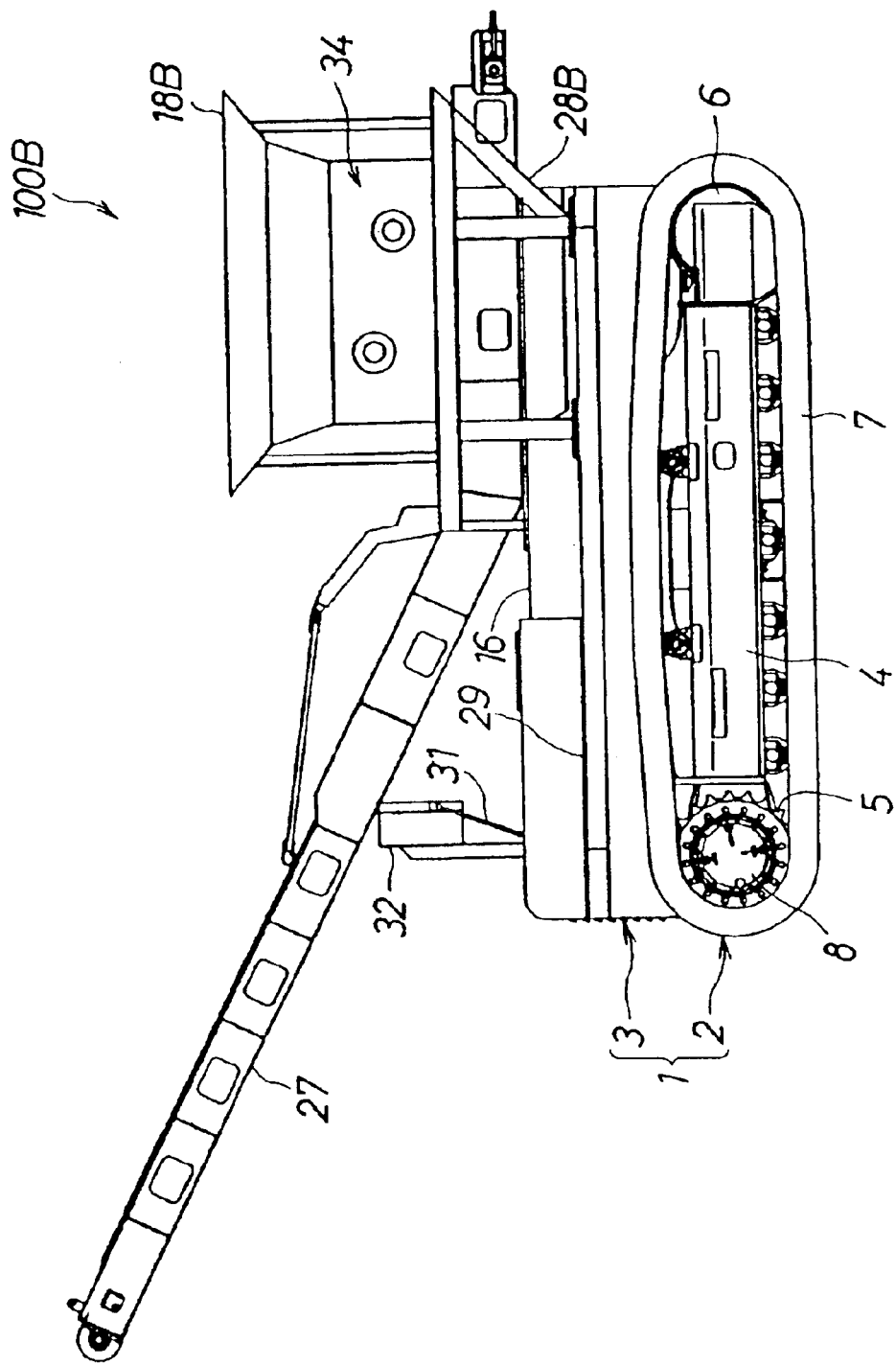
FIG. 11 is a side view showing an overall construction of another self-propelled mixing machine, which is constructed using the base unit equipped in one embodiment of the self-propelled recycling machine of the present invention.

FIG. 11 is a side view showing an overall construction of another self-propelled mixing machine, which is constructed using the base unit 1 equipped in one embodiment of the self-propelled recycling machine of the present invention. Note that similar components in FIG. 11 to those in FIG. 1 are denoted by the same reference numerals and a description thereof is omitted here.

In FIG. 11, reference numeral 34 denotes a tub-type mixing apparatus. In a self-propelled mixing machine 100B of FIG. 11, the transfer/delivery means 27 and the mixing apparatus 34 supported by a support frame 28B are provided as attachments on the base unit 1. In the self-propelled mixing machine 100B, the loaded recyclable materials are introduced to the mixing apparatus 34 through a receiving section 18B, agitated by the mixing apparatus 34, and then delivered to the outside of the machine by the transfer/delivery means 27.

Figure 12:
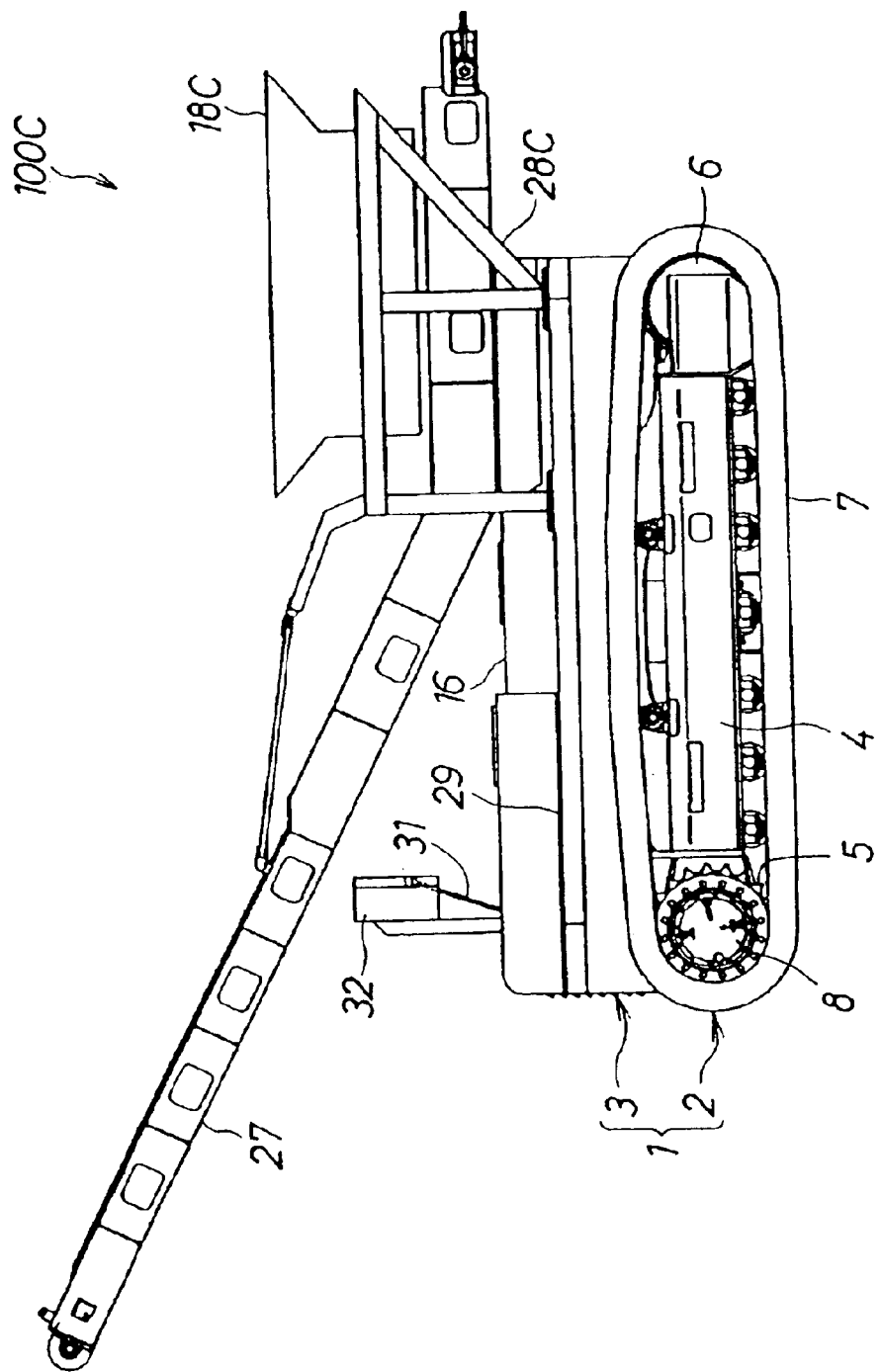
FIG. 12 is a side view showing an overall construction of a self-propelled supplying machine, which is constructed using the base unit equipped in one embodiment of the self-propelled recycling machine of the present invention.
Figure 13:
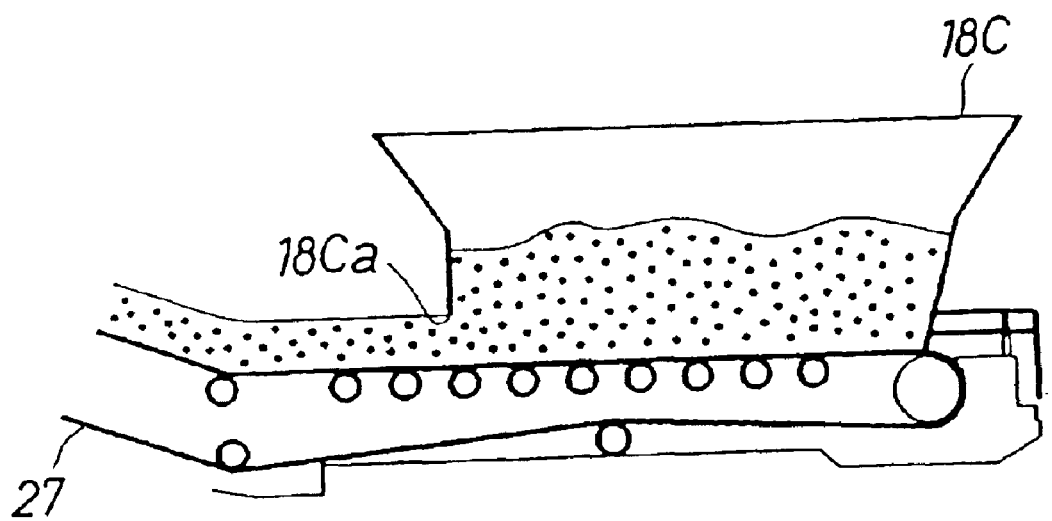
FIG. 13 is a side sectional view of a receiving section provided in the self-propelled supplying machine, which is constructed using the base unit equipped in one embodiment of the self-propelled recycling machine of the present invention.

FIG. 12 is a side view showing an overall construction of a self-propelled supplying machine, which is constructed using the base unit 1 equipped in one embodiment of the self-propelled recycling machine of the present invention, and FIG. 13 is a side sectional view of a receiving section provided in the self-propelled supplying machine. Note that similar components in FIGS. 12 and 13 to those in FIG. 1 are denoted by the same reference numerals and a description thereof is omitted here.

In a self-propelled supplying machine 100C shown in FIGS. 12 and 13, the transfer/delivery means 27 and a receiving section 18C supported by a support frame 28C are provided as attachments on the base unit 1. Reference numeral 18Ca denotes an opening (see FIG. 13) for dispensing the recyclable materials (e.g., earth and sand). The opening 18Ca is formed in a wall surface of the receiving section 18C downstream (left side in FIG. 12) of the transfer/delivery means 27 in the feed direction at a predetermined height so as to face a transport surface of the transfer/delivery means 27. Also, the opening 18Ca has a width set substantially equal to or slightly smaller than the width of the transport surface of the transfer/delivery means 27. In this self-propelled supplying machine 100C, the recyclable materials loaded into the receiving section 18C are delivered through the opening 18Ca to the outside of the machine by the transfer/delivery means 27, and then introduced to a receiving section of another type of self-propelled recycling machine, e.g., a self-propelled soil modifying machine.

Figure 14:
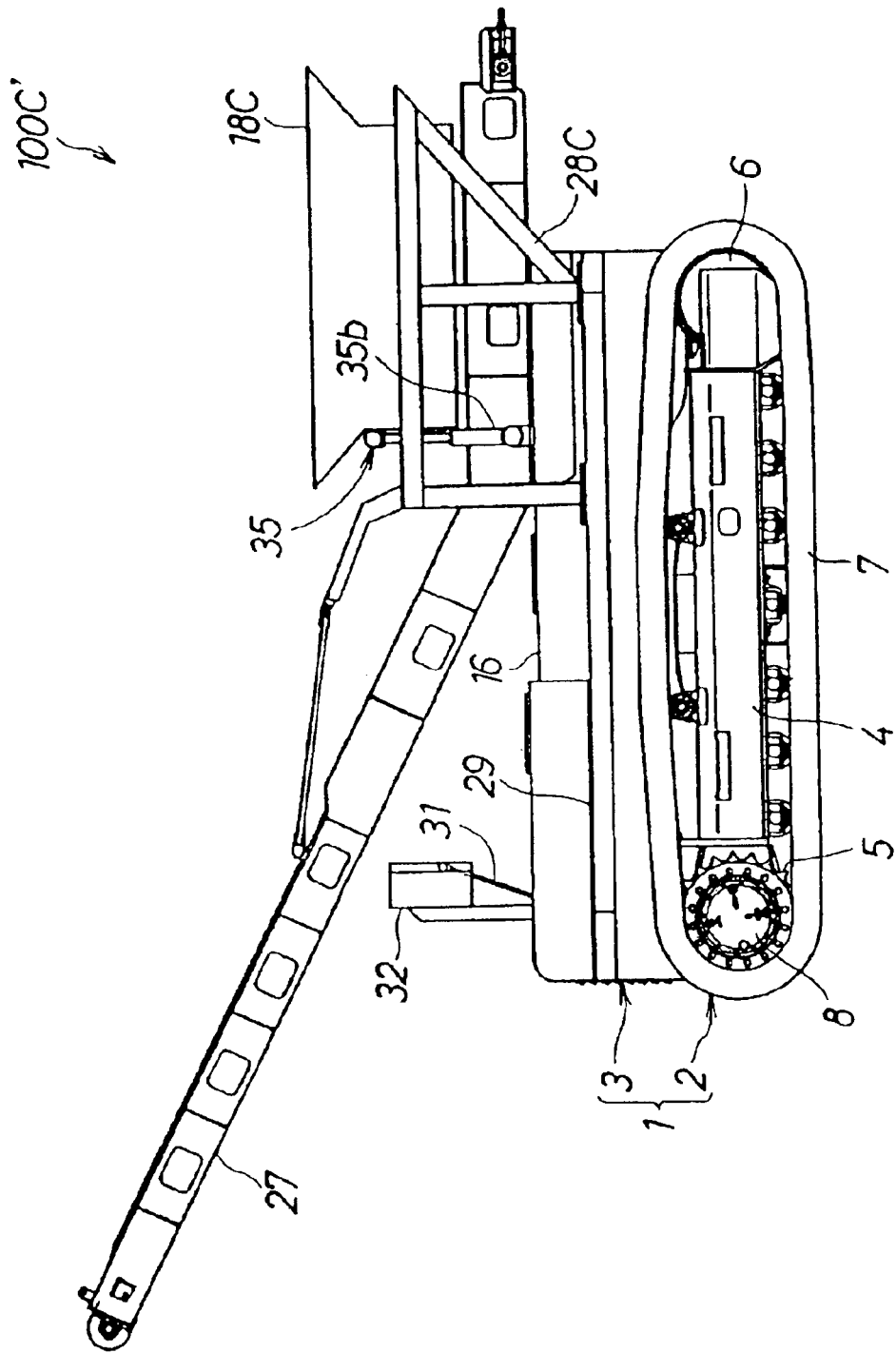
FIG. 14 is a side view showing an overall construction of another self-propelled supplying machine, which is constructed using the base unit equipped in one embodiment of the self-propelled recycling machine of the present invention.
Figure 15:
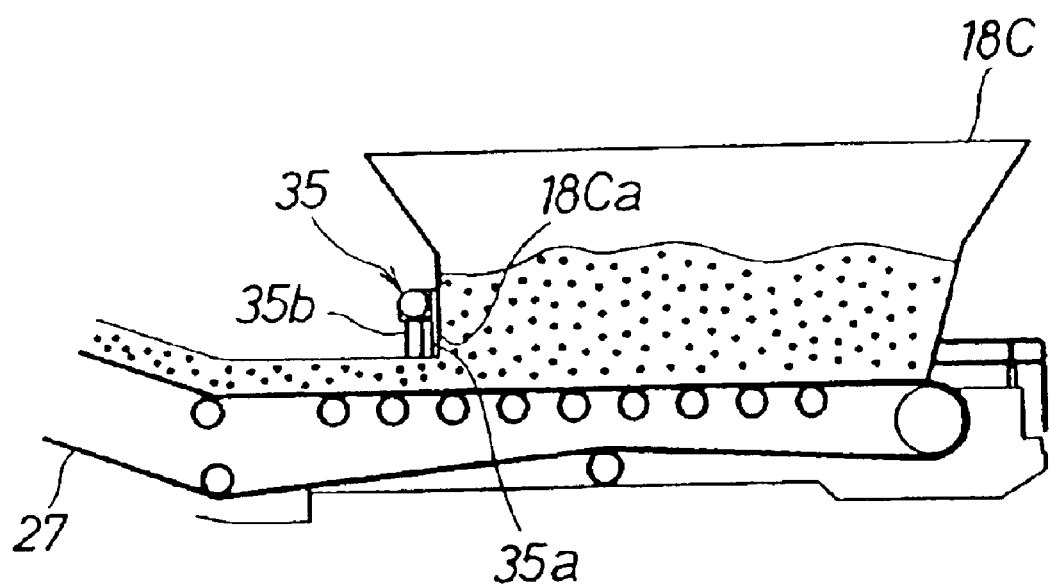
FIG. 15 is a side sectional view of a receiving section provided in another self-propelled supplying machine, which is constructed using the base unit equipped in one embodiment of the self-propelled recycling machine of the present invention.

FIG. 14 is a side view showing an overall construction of another self-propelled supplying machine, which is constructed using the base unit 1 equipped in one embodiment of the self-propelled recycling machine of the present invention, and FIG. 15 is a side sectional view of a receiving section provided in that self-propelled supplying machine. Note that similar components in FIGS. 14 and 15 to those in FIG. 1 are denoted by the same reference numerals and a description thereof is omitted here.

A self-propelled supplying machine 100C' shown in FIGS. 14 and 15 differs from the above-described self-propelled supplying machine 100C shown in FIGS. 12 and 13 in that an amount-of-dispensed-material adjusting means 35 is provided on an external wall of the receiving section 18C. The amount-of-dispensed-material adjusting means 35 comprises a gate 35a disposed outside the opening 18Ca and a hydraulic cylinder 35b for vertical sliding the gate 35a. Thus, in this self-propelled supplying machine 100C', an opening area of the opening 18Ca can be adjusted by vertically sliding the gate 35a. The recyclable materials loaded into the receiving section 18C are dispensed in unit amount corresponding to the area of the opening 18Ca adjusted by the gate 35a while passing through the opening 18Ca, and then delivered to the outside of the machine by the transfer/delivery means 27.

Figure 16:
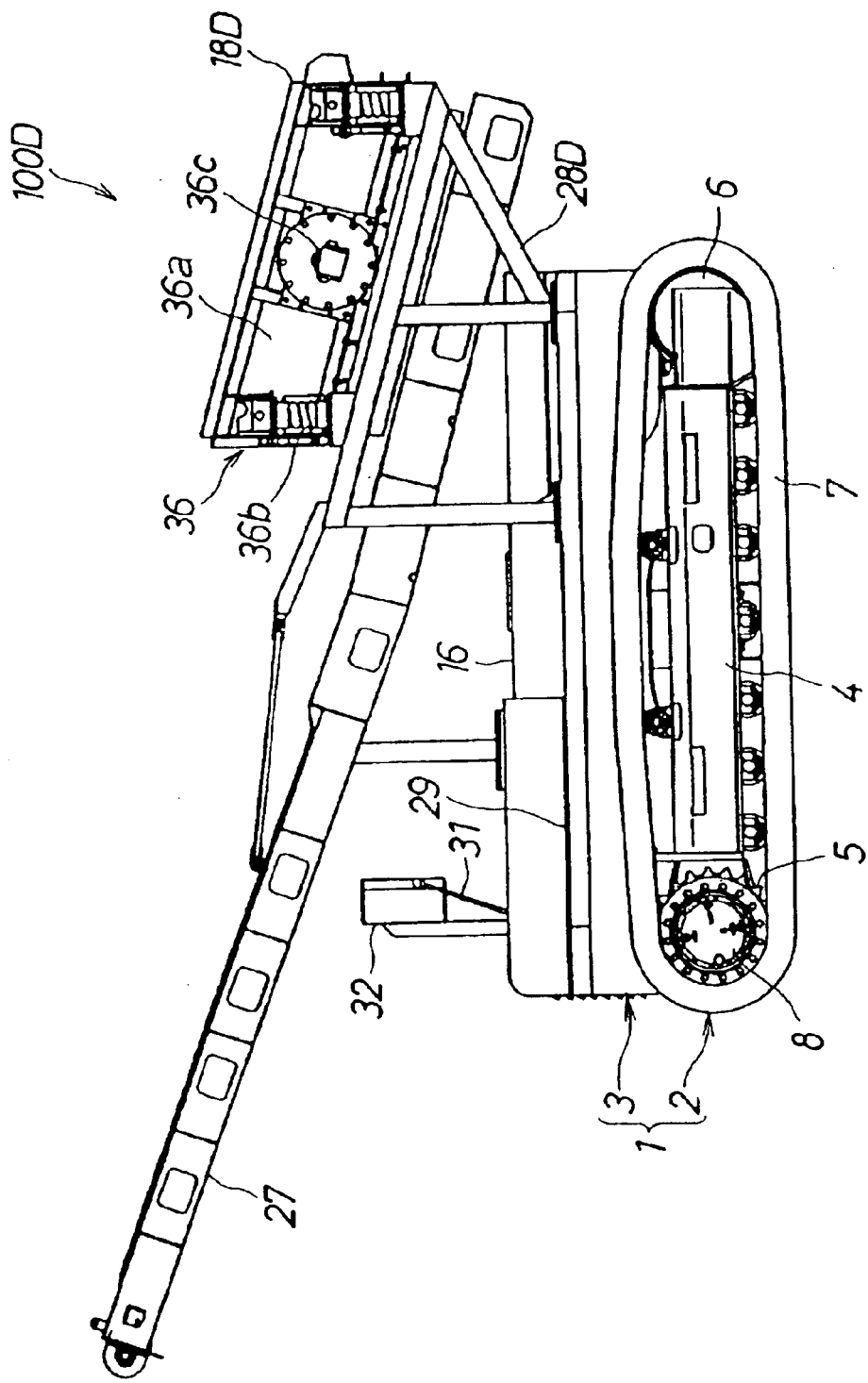
FIG. 16 is a side view showing an overall construction of a self-propelled sorting machine, which is constructed using the base unit equipped in one embodiment of the self-propelled recycling machine of the present invention.

FIG. 16 is a side view showing an overall construction of a self-propelled sorting machine, which is constructed using the base unit 1 equipped in one embodiment of the self-propelled recycling machine of the present invention. Note that similar components in FIG. 16 to those in FIG. 1 are denoted by the same reference numerals and a description thereof is omitted here.

In FIG. 16, reference numeral 36 denotes a sieving apparatus of the so-called vibration type. The sieving apparatus 36 has a body 36a, which is substantially in the form of a frame and is supported by a support frame 28D through springs 36b in a vibratable manner. Also, reference numeral 36c denotes a driving device for applying vibrations to the body 36a. The vibrating device 36 is directly coupled to a rotary shaft (not shown) inserted in the body 36a, and rotates an eccentric drum (not shown) so that vibrations are applied to the body 36a. With a self-propelled sorting machine 100D having such a construction, a part of the recyclable materials loaded into a receiving section 18D at a top of the vibrating sieving apparatus 36, which is larger than the mesh of a screen (not shown) provided within the body 36a, is removed and then delivered to the outside of the machine (to the right in FIG. 16 in this example). Another part of the recyclable materials, which is smaller than the screen mesh, is selected and then guided onto the transfer/delivery means 27, following which it is introduced to a receiving section of another type of self-propelled recycling machine, e.g., a self-propelled soil modifying machine. Of course, the recyclable materials can be sorted so as to have desired grain sizes depending on the grain size required for the recyclable materials by using an appropriate one of screens having different meshes.

Figure 17:
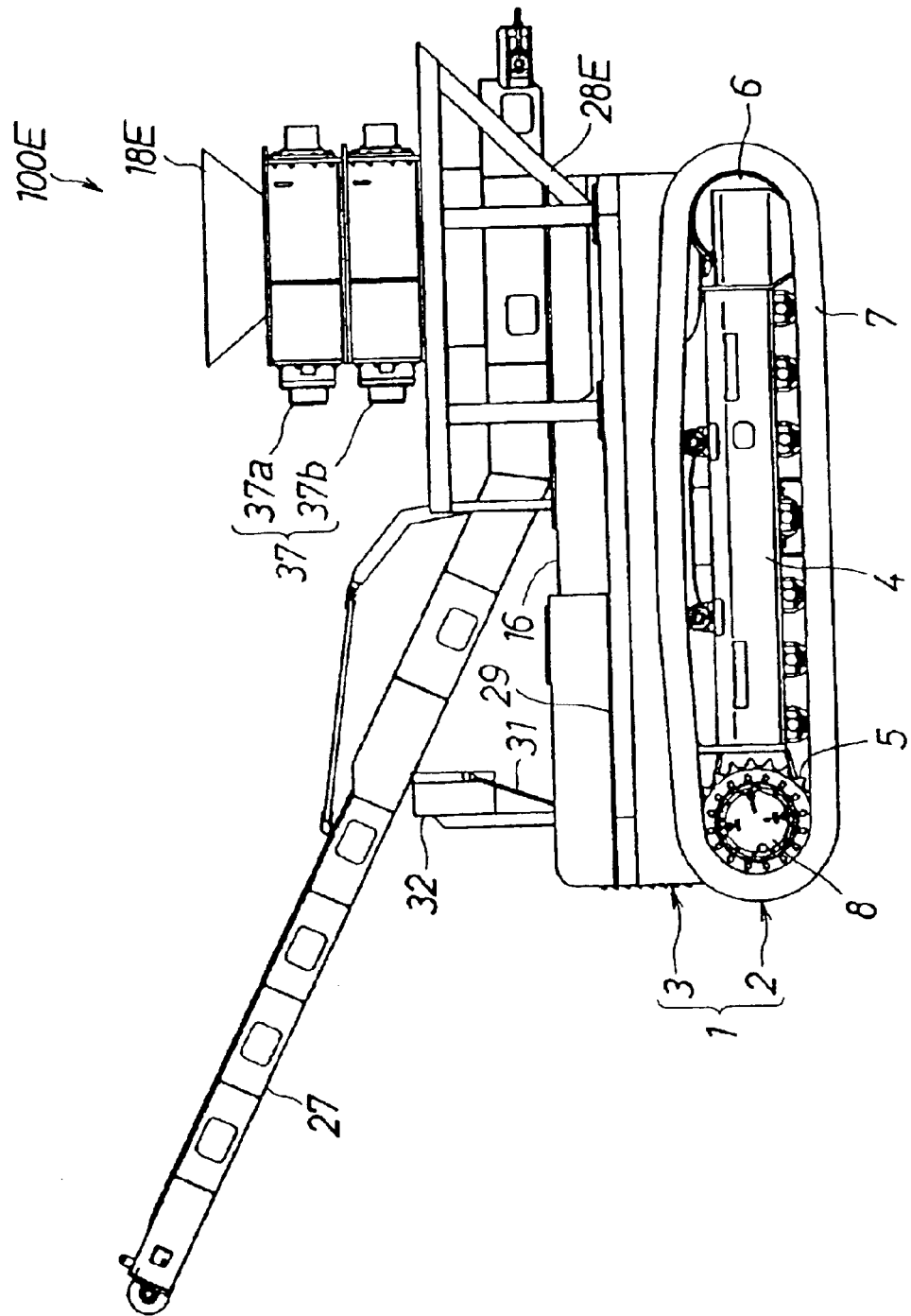
FIG. 17 is a side view showing an overall construction of a self-propelled granulating machine, which is constructed using the base unit equipped in one embodiment of the self-propelled recycling machine of the present invention.

FIG. 17 is a side view showing an overall construction of a self-propelled granulating machine, which is constructed using the base unit 1 equipped in one embodiment of the self-propelled recycling machine of the present invention. Note that similar components in FIG. 17 to those in FIG. 1 are denoted by the same reference numerals and a description thereof is omitted here.

In FIG. 17, reference numeral 37 denotes a granulating apparatus for granulating the loaded recyclable materials. The granulating apparatus 37 comprises a compressive kneading apparatus 37a for compressing and kneading the recyclable materials received into a receiving section 18E, and a disintegrating apparatus 37b for shearing the recyclable materials, which have been compressed and kneaded by the compressive kneading apparatus 37a, and then guiding them onto the transfer/delivery means 27.

Although a detailed internal structure of the compressive kneading apparatus 37a is not specifically shown, the compressive kneading apparatus 37a includes, for example, two compression rotors. Earth and sand, etc. having a high water content and being in the form of, e.g., the so-called dehydrated cakes are introduced as the recyclable materials to between the compression rotors for further appropriate dehydration so that the recyclable materials are delivered in a more brittle state to the disintegrating apparatus 37b. On the other hand, the disintegrating apparatus 37b includes, for example, two mills rotating at high speeds. The recyclable materials in the more brittle state are disintegrated under shearing by the high-speed rotating mills, whereby the recyclable materials are granulated so as to have a predetermined grain size.

In a self-propelled granulating machine 100E shown in FIG. 17, the compressive kneading apparatus 37a and the disintegrating apparatus 37b supported by a support frame 28E are provided, together with the transfer/delivery means 27, as attachments on the base unit 1. In the self-propelled granulating machine 100E, the loaded recyclable materials are introduced to the granulating apparatus 37 through a receiving section 18E, and after being granulated into the predetermined grain size, they are delivered to the outside of the machine by the transfer/delivery means 27.

Figure 18:
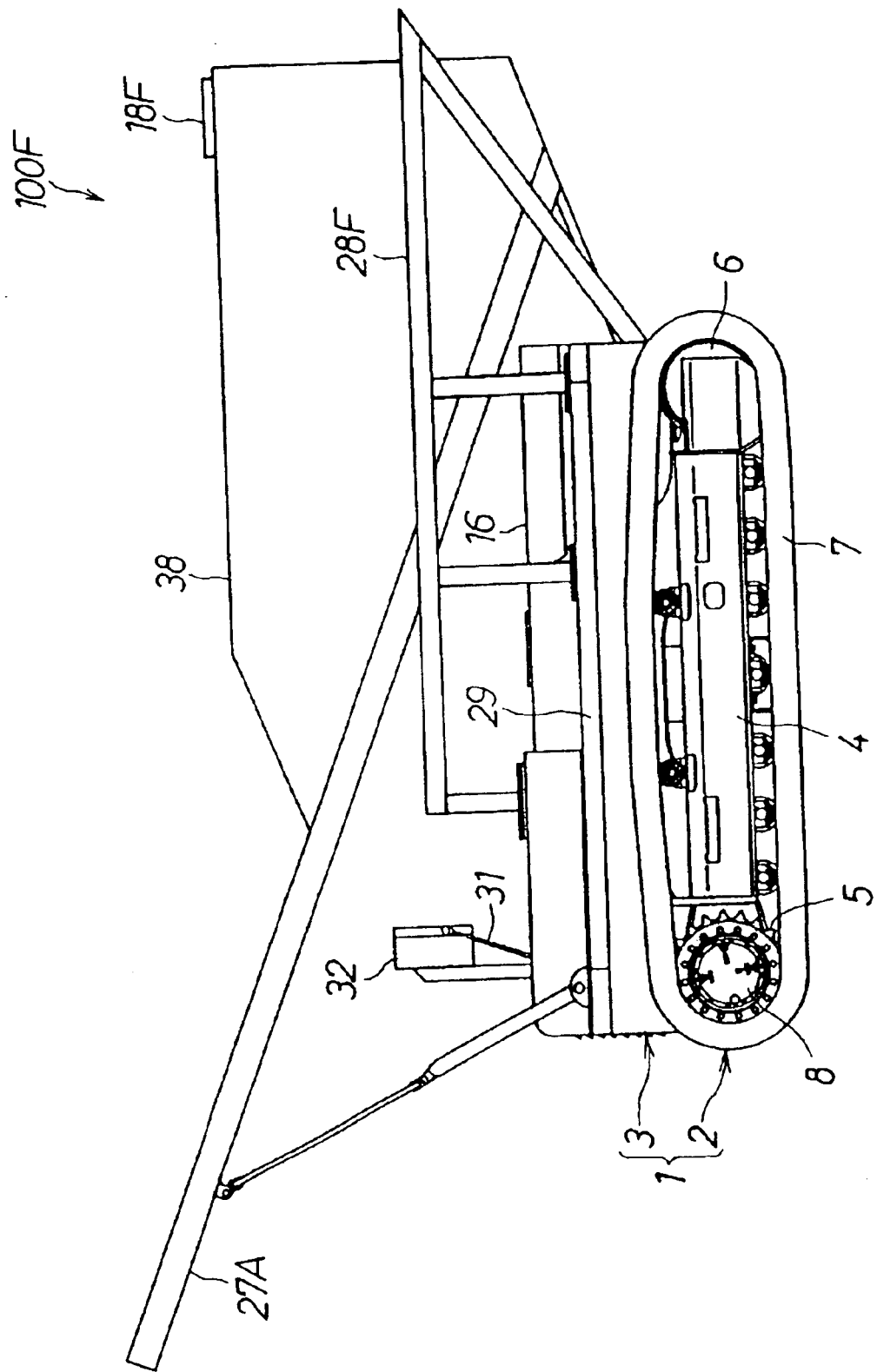
FIG. 18 is a side view showing an overall construction of a self-propelled powder dispensing machine, which is constructed using the base unit equipped in one embodiment of the self-propelled recycling machine of the present invention.

FIG. 18 is a side view showing an overall construction of a self-propelled powder dispensing machine, which is constructed using the base unit 1 equipped in one embodiment of the self-propelled recycling machine of the present invention. Note that similar components in FIG. 18 to those in FIG. 1 are denoted by the same reference numerals and a description thereof is omitted here.

In FIG. 18, reference numeral 38 denotes a powder reservoir (silo) for reserving powdery materials, such as lime and cement. Under the reservoir 38, a transfer/delivery means 27A constructed by a screw conveyor is disposed to extend toward the left side, as viewed in FIG. 18, while gradually rising. Thus, in a self-propelled powder dispensing machine 100F shown in FIG. 18, the transfer/delivery means 27A and the reservoir 38 supported by a support frame 28F are provided as attachments on the base unit 1. Powder having a very small particle size and being tend to easily scatter is reserved in the reservoir 38 through a receiving section 18F. The powder in the reservoir 38 is delivered to the outside of the machine in a sealed-off state by the transfer/delivery means 27A, and then introduced to a receiving section of another type of self-propelled recycling machine, e.g., a self-propelled mixing machine.

Figure 19:
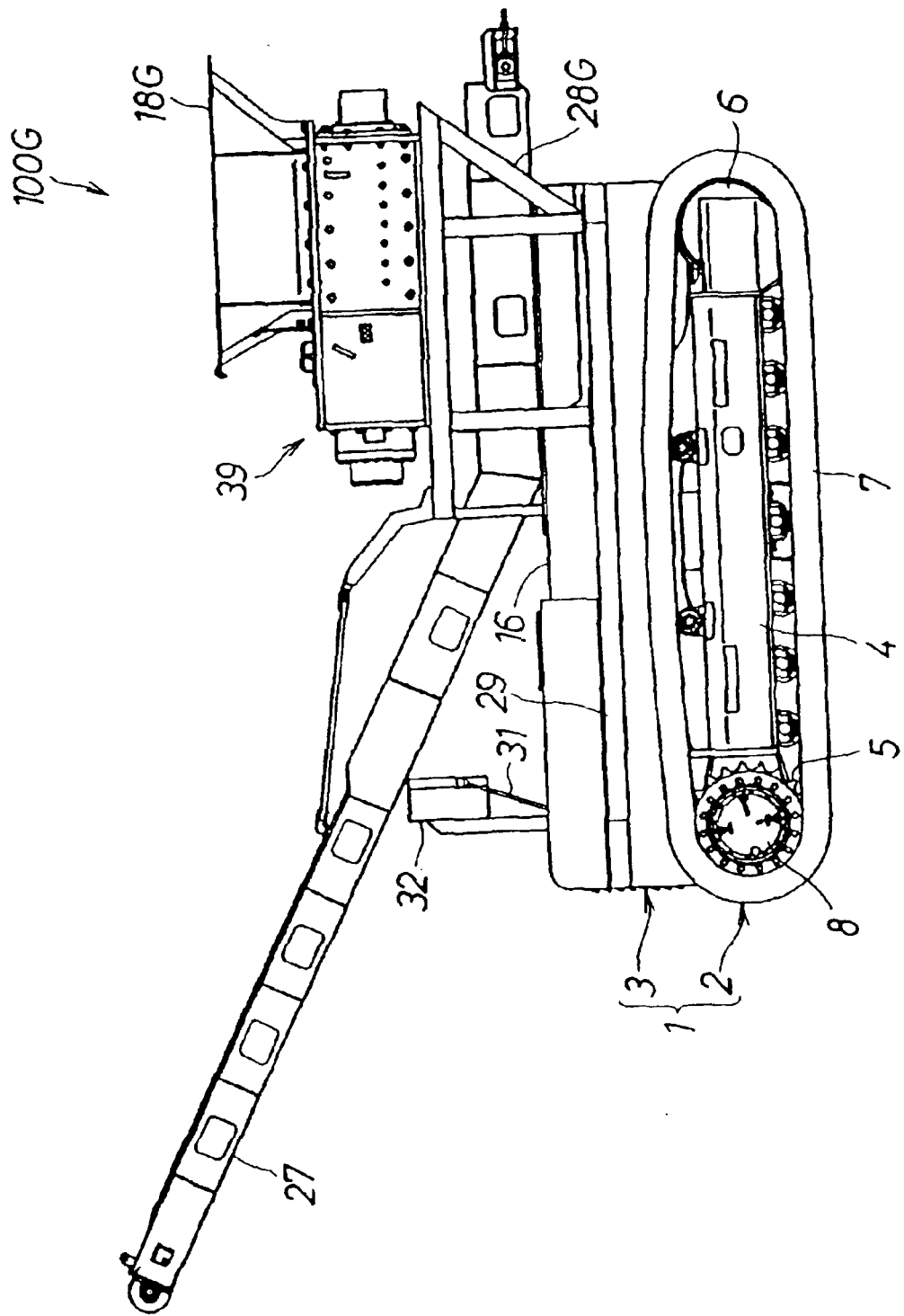
FIG. 19 is a side view showing an overall construction of one self-propelled crushing machine, which is constructed using the base unit equipped in one embodiment of the self-propelled recycling machine of the present invention.

FIG. 19 is a side view showing an overall construction of one self-propelled crushing machine, which is constructed using the base unit 1 equipped in one embodiment of the self-propelled recycling machine of the present invention. Note that similar components in FIG. 19 to those in FIG. 1 are denoted by the same reference numerals and a description thereof is omitted here.

In FIG. 19, reference numeral 39 denotes a crushing apparatus (shredder) for crushing materials to be crushed, e.g., waste tires, as the recyclable materials. Though not specifically shown for the sake of simplicity, the crushing apparatus 39 includes a plurality (e.g., two) of rotating members provided with many cutters inserted in rotary shafts. Adjacent two of those rotating members mesh with each other and crush the recyclable materials under shearing, which are introduced to between the rotating members.

Thus, in a self-propelled crushing machine 100G of FIG. 11, the transfer/delivery means 27, a receiving section 18G and the crushing apparatus 39 supported by a support frame 28G are provided as attachments on the base unit 1. The loaded recyclable materials are introduced to the crushing apparatus 39 through the receiving section 18G, and after being crushed, they are delivered to the outside of the machine by the transfer/delivery means 27.

Figure 20:
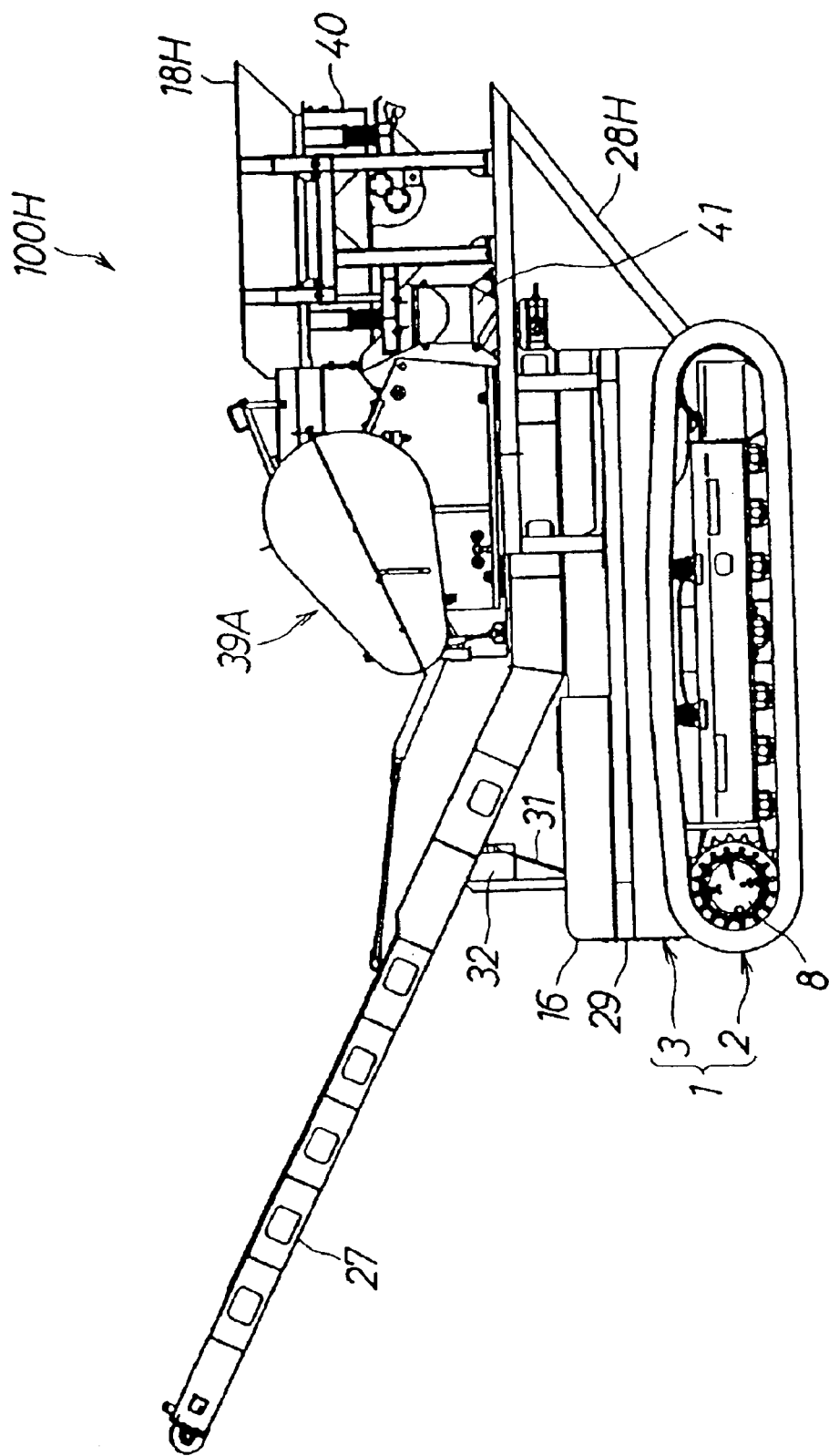
FIG. 20 is a side view showing an overall construction of another self-propelled crushing machine, which is constructed using the base unit equipped in one embodiment of the self-propelled recycling machine of the present invention.

FIG. 20 is a side view showing an overall construction of another self-propelled crushing machine, which is constructed using the base unit 1 equipped in one embodiment of the self-propelled recycling machine of the present invention. Note that similar components in FIG. 20 to those in FIG. 1 are denoted by the same reference numerals and a description thereof is omitted here.

In FIG. 20, reference numeral 39A denotes a crushing apparatus (so-called jaw crusher) for crushing materials to be crushed, e.g., rocks, as the recyclable materials. Though not specifically shown for the sake of simplicity, the crushing apparatus 39A includes swinging movable teeth and fixed teeth. The recyclable materials introduced to between these movable teeth and fixed teeth are crushed while being crunched with swinging motions of the movable teeth.

Further, reference numeral 40 denotes a grizzly feeder. Though not specifically shown, the grizzly feeder 40 includes a plurality of plates arranged in the form of steps and each having a fore end in the form of comb teeth, and the materials to be crushed, which are loaded through a receiving section 18H, are successively fed to the crushing apparatus 39A with vibrations of the plates. At the same time, during the feed of the materials to be crushed, small grains, fine earth and sand, etc. contained in the recyclable materials are dropped downward through a chute 41 from gaps of the comb teeth at the fore end of each plate and then guided onto the transfer/delivery means 27.

Thus, in a self-propelled crushing machine 100H of FIG. 20, the transfer/delivery means 27, the receiving section 18H, the crushing apparatus 39A, the grizzly feeder 40, the chute 41, etc. supported by a support frame 28H are provided as attachments on the base unit 1. In this self-propelled crushing machine 100H, the recyclable materials introduced to the grizzly feeder 40 through the receiving section 18H are crushed by the crushing apparatus 39A and delivered to the outside of the machine by the transfer/delivery means 27 along with the small grains introduced through the chute 41.

As seen from the above description with reference to FIGS. 10 to 20, the base unit 1 can be employed in common in the various types of self-propelled recycling machines, and the various component units mounted on the base unit 1 can be easily replaced as attachments while the base unit 1 is used as a common base structure. Consequently, the manufacturing costs of the various types of self-propelled recycling machines can be greatly reduced.

Generally, in many of sites where the above-mentioned types of self-propelled recycling machines operate, recycled products are delivered to the outside of the machine by the transfer/delivery means (delivery conveyor) and accumulated on the ground, for example. In those cases, the height of the accumulated recycled products increases with the progress of works and the accumulated recycled products eventually contact with the transfer/delivery means. Therefore, when the recycled products are accumulated in certain amount, the self-propelled recycling machine is moved to a new accumulation place and resumes the works again. It can be hence said that, with the transfer/delivery means (delivery conveyor) having a higher delivery level, i.e., with the downstream end of the transfer/delivery means in the feed direction being positioned at a higher level, it is possible to accumulate a larger amount of recycled products in one place, to reduce the frequency of change in the work position, and to improve the working efficiency.

On the other hand, in many of conventional self-propelled recycling machines, transfer/delivery means is disposed so as to locate under a body frame and to rise toward the outside of the machine from a position under various processing apparatuses. Then, a power unit and various components units are arranged to project from both ends of the body frame toward the outside of the machine. Hence, an inclination angle of the transfer/delivery means has a limit in order to avoid interference with those projected parts. Further, the transfer/delivery means develops a force for feeding the recycled products with friction acting between the feed belt surface and the recycled products. Also from this point of view, the inclination angle of the transfer/delivery means cannot be set to a so large value. However, the above-mentioned type of self-propelled recycling machine is transported by, e.g., a trailer in many cases and has limits on the machine length and height. In other words, the transfer/delivery means preferably has a relatively high delivery height, but it has been difficult to ensure a sufficient delivery height of the transfer/delivery means because of the limit on the machine length.

In this embodiment, since the transfer/delivery means 27 is disposed on the base unit 1 and this implies that the transfer/delivery means 27 is positioned at a level resulting from sliding it in a translational relation upward from the level where the transfer/delivery means was positioned in the conventional self-propelled recycling machine, the delivery height of the transfer/delivery means 27 can be increased without increasing the machine length. Accordingly, the production efficiency of the recycled products can be improved without moving the machine with the progress of works. Also, for example, when the accumulated recycled products are periodically transferred using a wheel loader, etc., the recycled products can be continuously produced without essentially changing the work position, thus resulting in higher working efficiency. Further, when the delivery height is set to a level comparable to that in the conventional machine, the machine length can be greatly reduced, thus resulting in advantages that the machine can make a smaller turn in the work site and has improved mobility.

Figure 21:
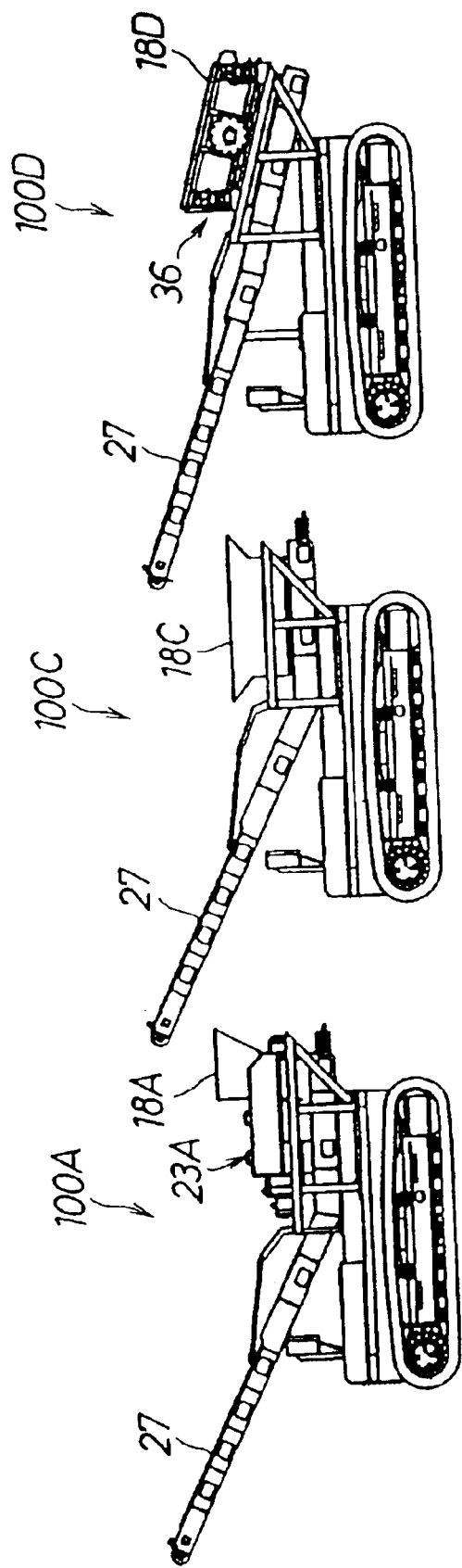
FIG. 21 is a side view of a recyclable-material processing system constructed by arranging the self-propelled sorting machine, the self-propelled supplying machine and the self-propelled mixing machine in tandem, which are each constructed using the base unit equipped in one embodiment of the self-propelled recycling machine of the present invention.

Moreover, in this embodiment, since the delivery height of the transfer/delivery means 27 is set higher than the receiving section 18, a system can be constructed by arranging the self-propelled sorting machine 100D, the self-propelled supplying machine 100C and the self-propelled mixing machine 100A in tandem, for example, as shown in FIG. 21.

In FIG. 21, earth and sand, etc. loaded by a hydraulic excavator or the like are introduced as the recyclable materials to the sieving apparatus 36 of the self-propelled sorting machine 100D through the receiving section 18D. Then, the earth and sand sorted by the sieving apparatus 36 are introduced to the receiving section 18C of the self-propelled supplying machine 100C by the transfer/delivery means 27. The sorted earth and sand are dispensed from the receiving section 18C in units of predetermined volume and introduced to the receiving section 18A of the self-propelled mixing machine 100A. Finally, the earth and sand are evenly agitated and mixed by the mixing apparatus 23A, and then delivered out of the machine by the transfer/delivery means 27.

Stated otherwise, since the delivery height of the transfer/delivery means is set higher than the receiving section, the materials delivered by the transfer/delivery means can be directly introduced to the receiving section of another self-propelled recycling machine. Therefore, a recyclable-material processing system capable of realizing the objective processing can be easily constructed by properly arranging various types of self-propelled recycling machines having desired functions in tandem with no need of installing additional belt conveyors, etc. Since the recyclable-material processing system can be easily constructed by employing the self-propelled machines in such a way, the overall system can be given with mobility.

Another embodiment of the self-propelled recycling machine the present invention will be described below.

Figure 22:
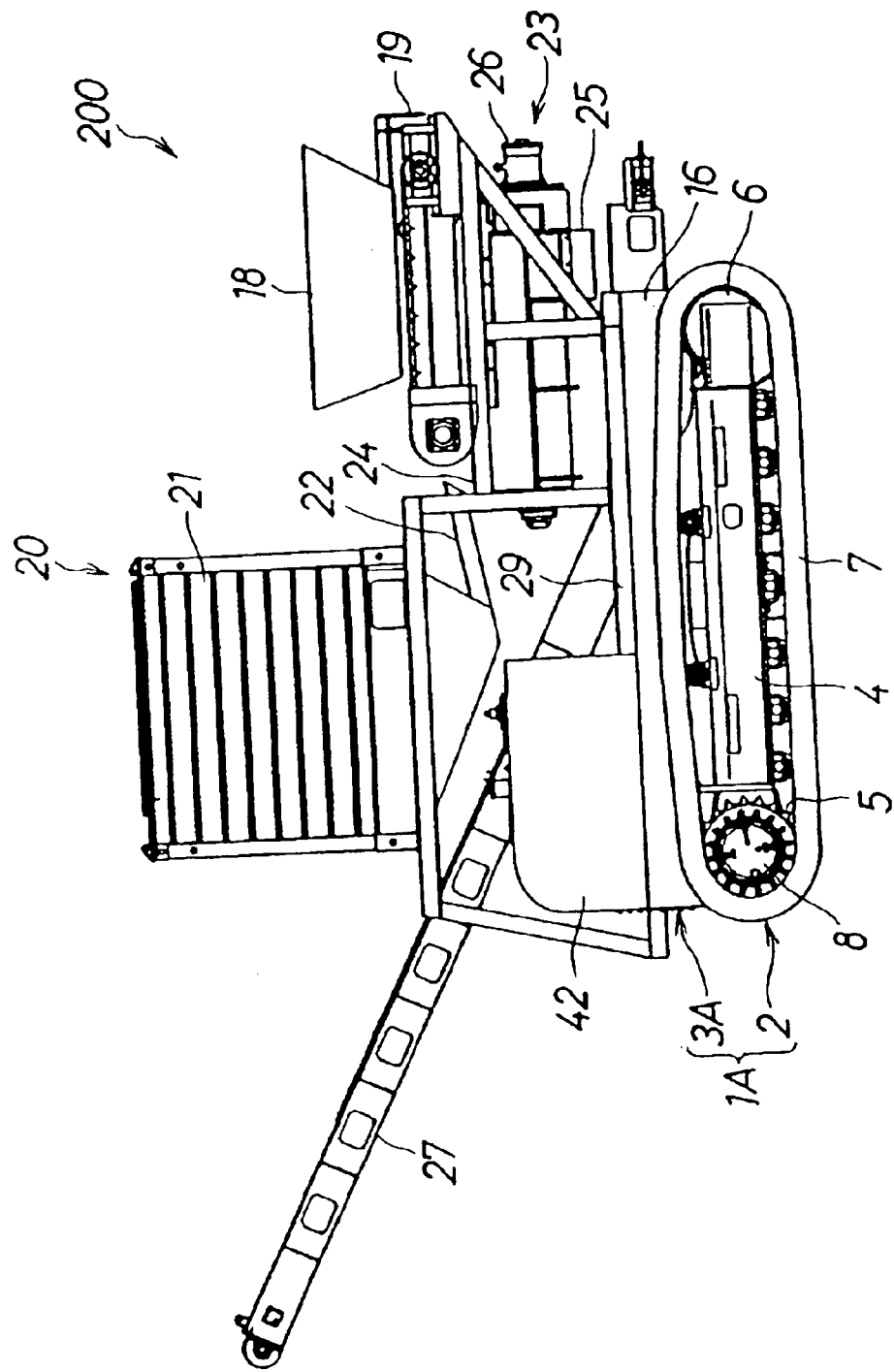
FIG. 22 is a side view showing an overall structure of another embodiment of the self-propelled recycling machine of the present invention.
Figure 23:
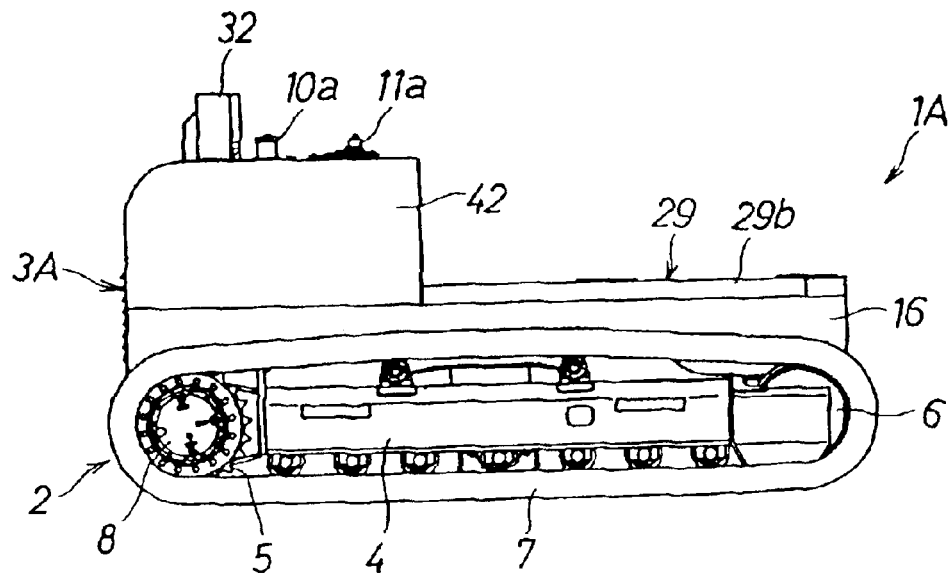
FIG. 23 is a side view showing an external structure of a base unit equipped in another embodiment of the self-propelled recycling machine of the present invention.
Figure 24:
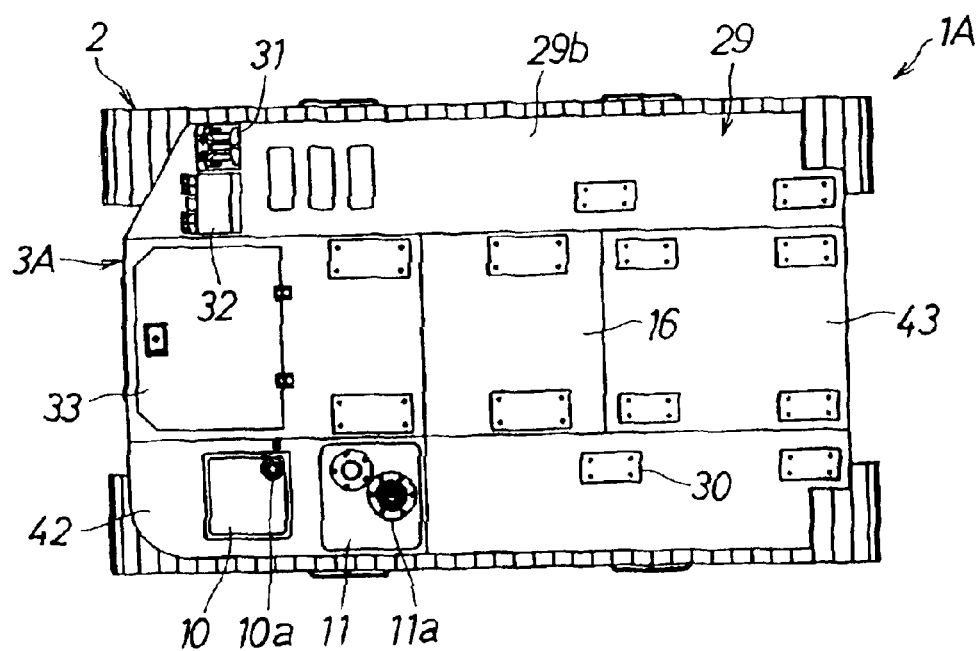
FIG. 24 is a plan view showing an external structure of the base unit equipped in another embodiment of the self-propelled recycling machine of the present invention.

FIG. 22 is a side view showing an overall structure of another embodiment of the self-propelled recycling machine of the present invention, FIG. 23 is a side view showing an external structure of a base unit equipped in another embodiment of the self-propelled recycling machine of the present invention, and FIG. 24 is a plan view showing an external structure of the base unit. Note that components in FIGS. 22 to 24 similar to or having similar functions to those in FIGS. 1 to 3 are denoted by the same reference numerals and a description thereof is omitted here.

In FIGS. 22 to 24, reference numeral 1A denotes a base unit equipped in this embodiment. The base unit 1A comprises traveling units 2, a power unit 3A, and a base frame 29. Reference numeral 42 denotes a tank cover, which is disposed on the base frame 29 at one end (left side in FIG. 22) in the longitudinal direction thereof and houses the fuel tank 10 and the hydraulic fluid tank 11. Also, the tank cover 42 is positioned above the traveling unit 2 on one side (in this example, the traveling unit 2 on the upper side in FIG. 24).

Figure 25:
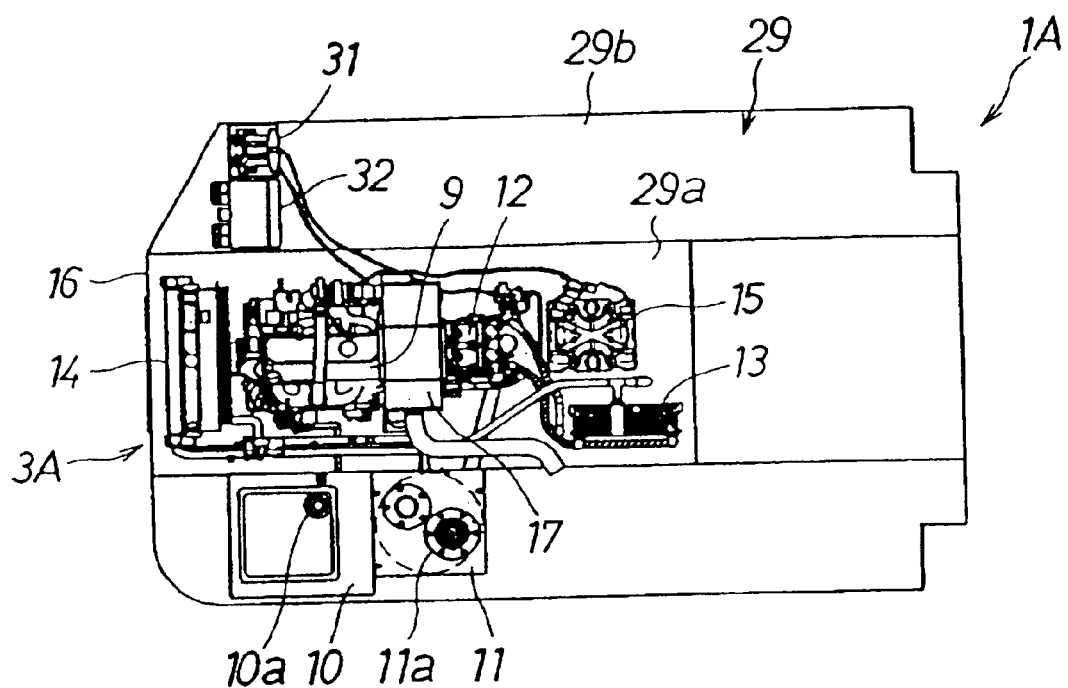
FIG. 25 is an internal plan view showing a detailed structure of a power unit equipped in another embodiment of the self-propelled recycling machine of the present invention.

FIG. 25 is an internal plan view showing a detailed structure of the power unit 3A. Note that components in FIG. 25 similar to or having similar functions to those in FIG. 5 are denoted by the same reference numerals and a description thereof is omitted here.

As shown in FIG. 25, a part of various components constituting the power unit 3A, i.e., the engine 9, the hydraulic pump 12, the control valve device 13, the radiator 14, the battery 15, etc., are disposed in an accommodation space defined by the base frame 29 and the cover 16 so that they are arranged between the pair of traveling units 2 on one side (left side in FIG. 25) in the longitudinal direction thereof in concentrated layout, whereas the fuel tank 10 and the hydraulic fluid tank 22 are disposed above the traveling unit 2. With such a layout, a new free zone 43 (see FIG. 24) is created on the base plate 29 between the pair of traveling units 2 on the other side (right side in FIG. 25) in the longitudinal direction thereof. Then, a plurality (three in this example) of mount portions 30 are provided on the upper surface of the base frame 29 in the zone 43. In this embodiment, therefore, the zone 43 can be used to support a portion of the transfer/delivery means 27 on the upstream side (right side in FIG. 22) in the feed direction thereof, and the transfer/delivery means 27 can be arranged at a lower level than that in the one embodiment described above. Correspondingly, the height of the receiving section 18 is reduced. The remaining construction is the same as that in the one embodiment described above.

In many of the above-mentioned types of self-propelled recycling machines, the recyclable materials are generally loaded using a heavy loading machine such as a hydraulic excavator, and the height of the receiving section, which defines the loading height of the recyclable materials, is preferably set as low as possible. In this other embodiment, the receiving section 18 can be positioned at a level lower than that in the one embodiment described above, and hence workability in loading the recyclable materials can be increased while achieving essentially the same advantages as those in the one embodiment.

Of course, by using the base unit 1A equipped in the other embodiment, various types of self-propelled recycling machine can also be easily constructed in such a manner that the various component units mounted on the base unit are handled as attachments. Construction examples of those various types of self-propelled recycling machines will be described below one by one with reference to FIGS. 26 to 33.

Figure 26:
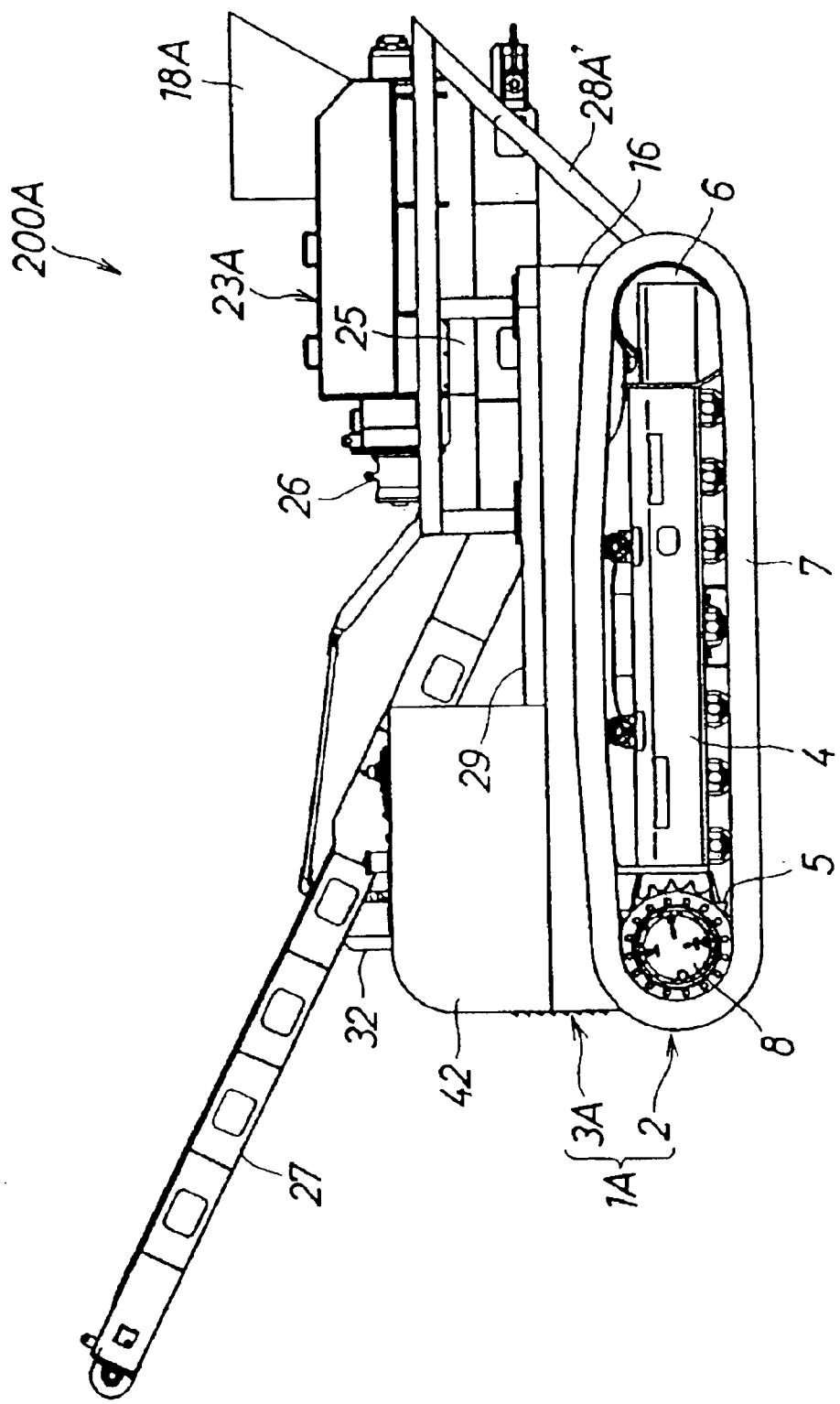
FIG. 26 is a side view, corresponding to FIG. 10, showing an overall construction of one self-propelled mixing machine, which is constructed using the base unit equipped in another embodiment of the self-propelled recycling machine of the present invention.

FIG. 26 is a side view, corresponding to FIG. 10, showing an overall construction of one self-propelled mixing machine, which is constructed using the base unit 1A equipped in another embodiment of the self-propelled recycling machine of the present invention. In a self-propelled mixing machine 200A shown in FIG. 26, the transfer/delivery means 27 and the mixing apparatus 23A supported by a support frame 28A' are disposed on the base unit 1A. The loaded recyclable materials are agitated in the mixing apparatus 23A and then delivered to the outside of the machine by the transfer/delivery means 27.

Figure 27:
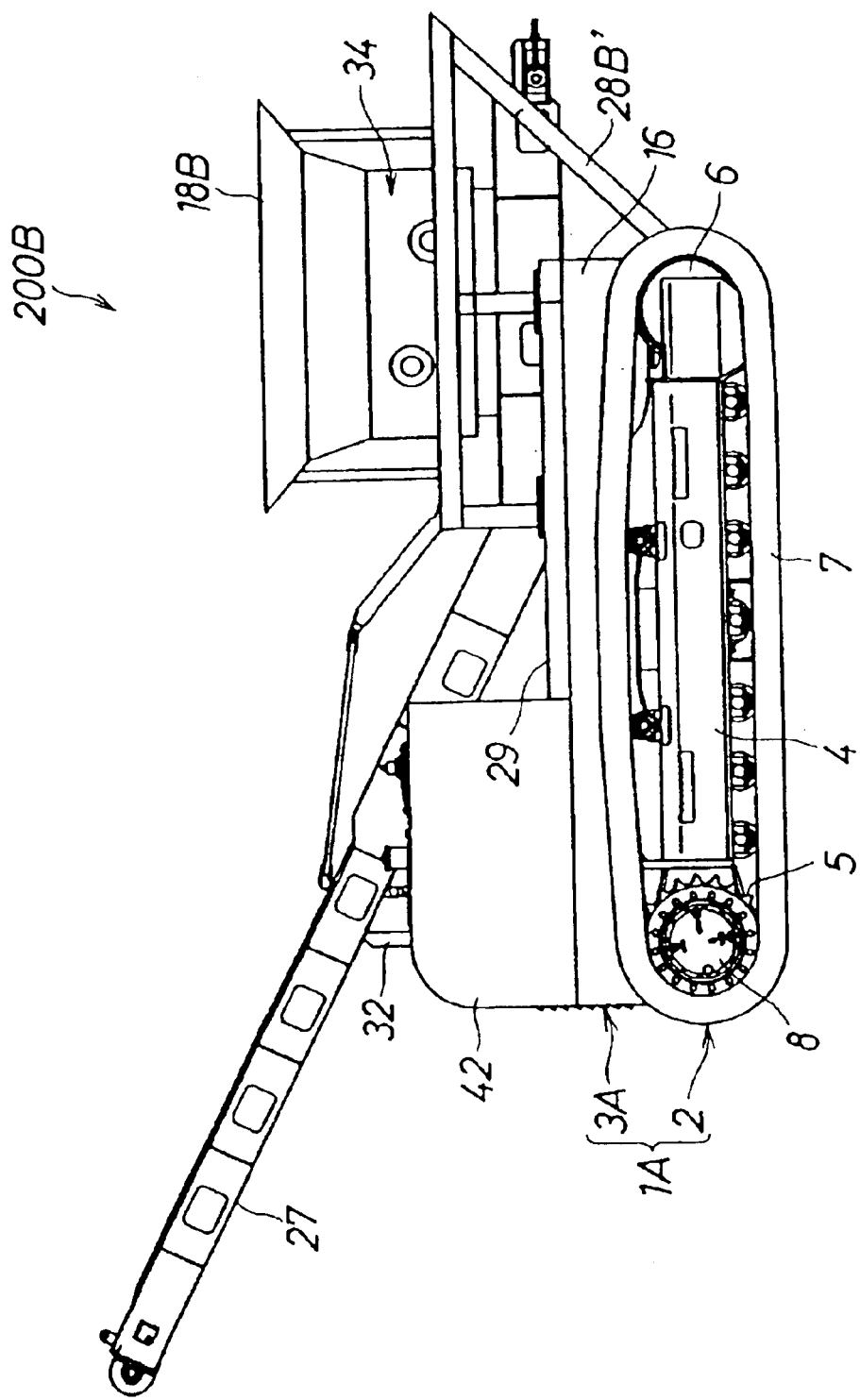
FIG. 27 is a side view, corresponding to FIG. 11, showing an overall construction of another self-propelled mixing machine, which is constructed using the base unit equipped in another embodiment of the self-propelled recycling machine of the present invention.

FIG. 27 is a side view, corresponding to FIG. 11, showing an overall construction of another self-propelled mixing machine, which is constructed using the base unit 1A equipped in another embodiment of the self-propelled recycling machine of the present invention. In a self-propelled mixing machine 200B shown in FIG. 27, the transfer/delivery means 27, the receiving section 18B and the mixing apparatus 34 supported by a support frame 28B' are disposed on the base unit 1A. The loaded recyclable materials are agitated in the mixing apparatus 34 and then delivered to the outside of the machine.

Figure 28:
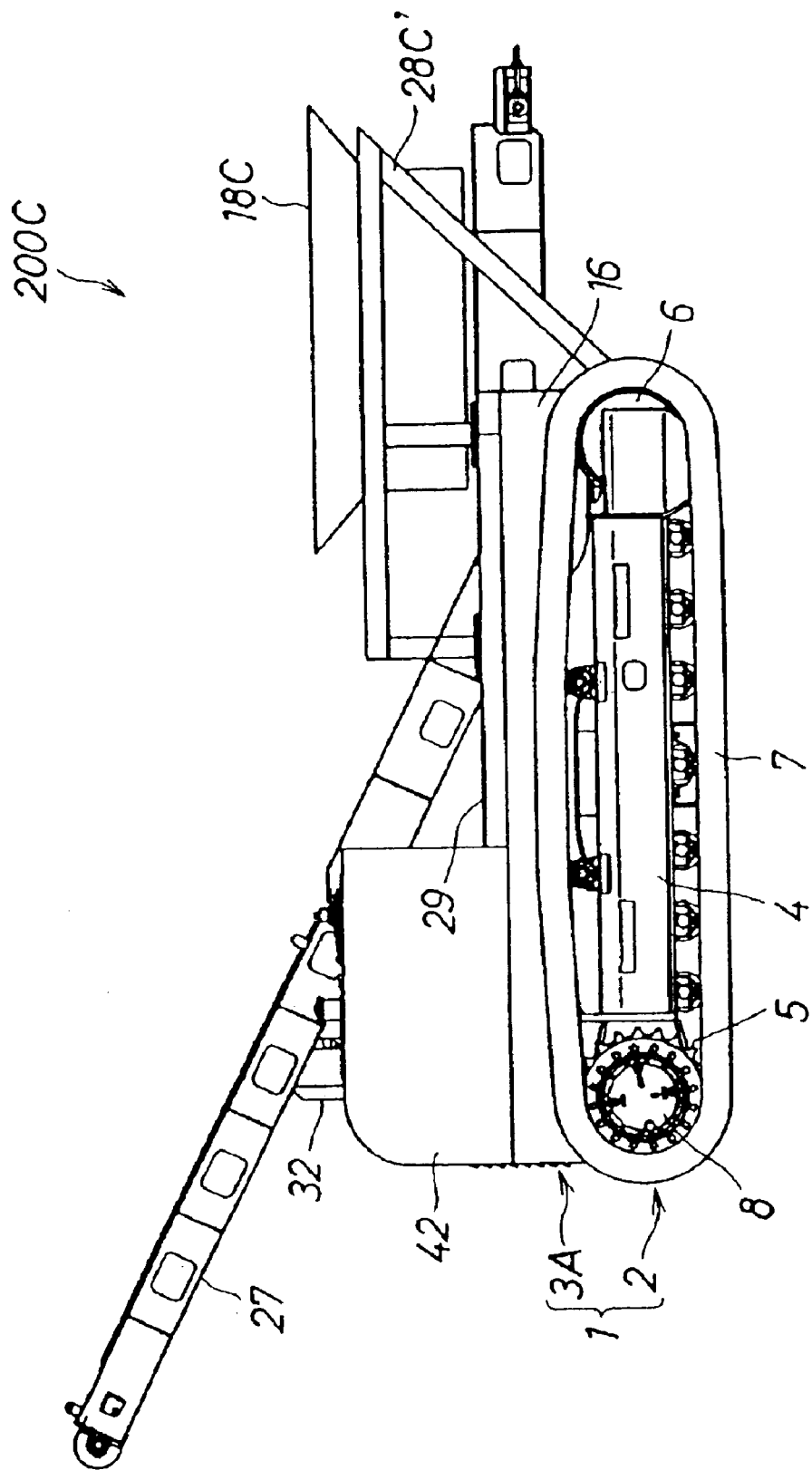
FIG. 28 is a side view, corresponding to FIG. 12, showing an overall construction of a self-propelled supplying machine, which is constructed using the base unit equipped in another embodiment of the self-propelled recycling machine of the present invention.

FIG. 28 is a side view, corresponding to FIG. 12, showing an overall construction of a self-propelled supplying machine, which is constructed using the base unit 1A equipped in another embodiment of the self-propelled recycling machine of the present invention. In a self-propelled supplying machine 200C shown in FIG. 28, the transfer/delivery means 27 and the receiving section 18C supported by a support frame 28C' are disposed on the base unit 1A. The recyclable materials loaded into the receiving section 18C are delivered to the outside of the machine by the transfer/delivery means 27, and then introduced in units of predetermined amount to the receiving section of another type of self-propelled recycling machine, e.g., a self-propelled soil modifying machine.

Figure 29:
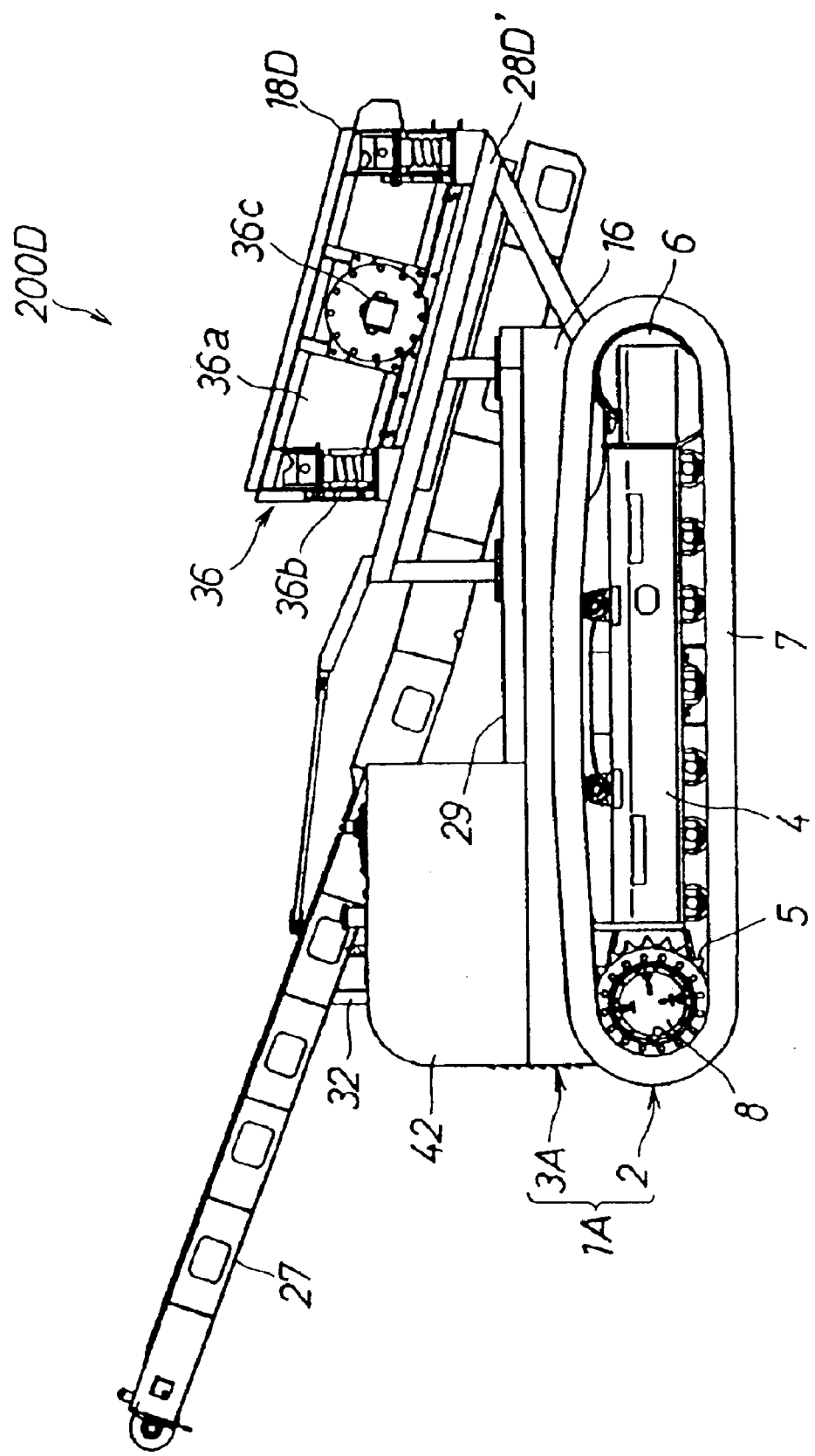
FIG. 29 is a side view, corresponding to FIG. 16, showing an overall construction of a self-propelled sorting machine, which is constructed using the base unit equipped in another embodiment of the self-propelled recycling machine of the present invention.

FIG. 29 is a side view, corresponding to FIG. 16, showing an overall construction of a self-propelled sorting machine, which is constructed using the base unit 1A equipped in another embodiment of the self-propelled recycling machine of the present invention. In a self-propelled sorting machine 200D shown in FIG. 29, the transfer/delivery means 27 and the sieving apparatus 36 supported by a support frame 28D' are disposed on the base unit 1A. The loaded recyclable materials are guided onto the transfer/delivery means 27 after being sorted depending on the grain size, and then introduced to the receiving section of another type of self-propelled recycling machine, e.g., a self-propelled soil modifying machine.

Figure 30:
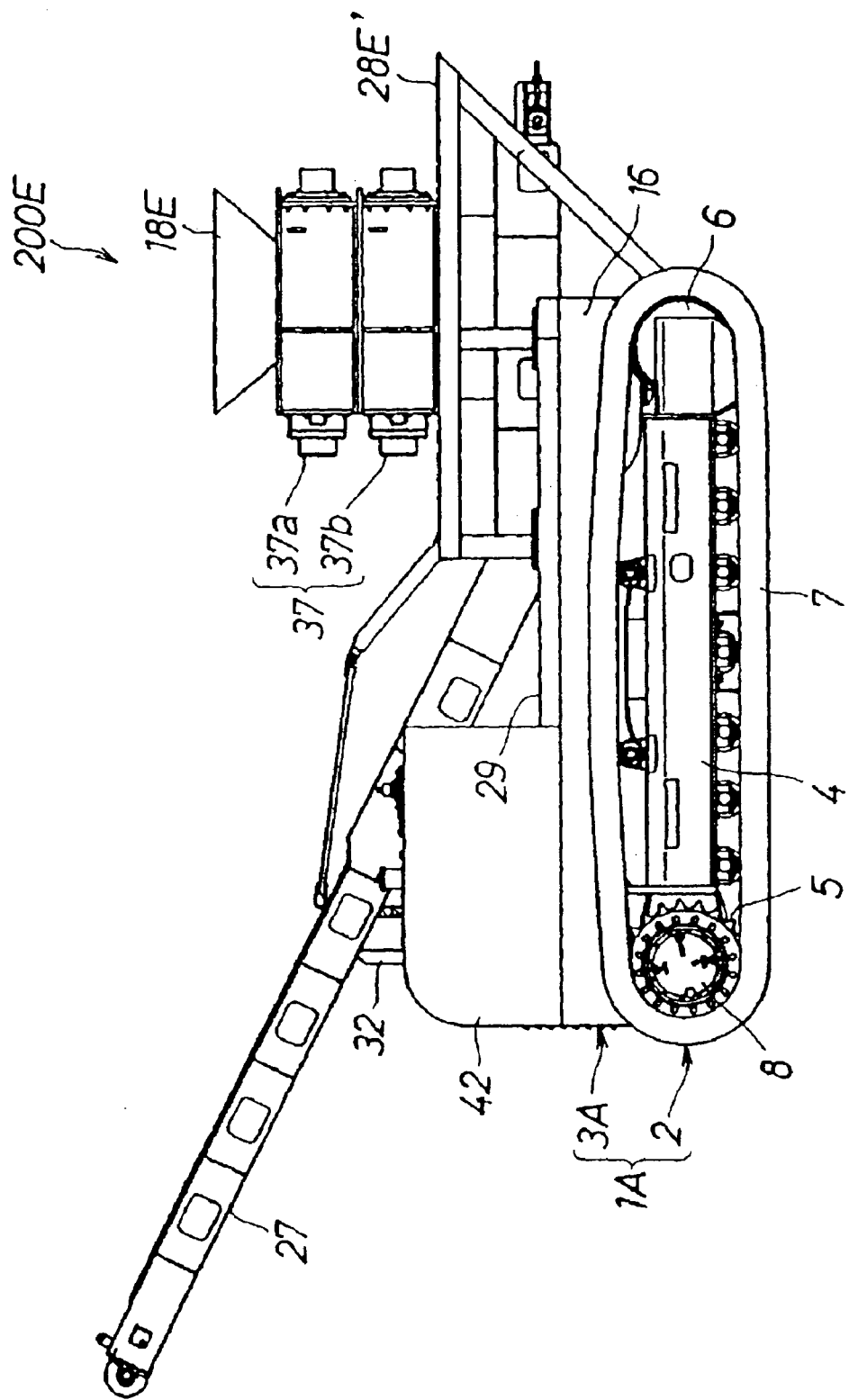
FIG. 30 is a side view, corresponding to FIG. 17, showing an overall construction of a self-propelled granulating machine, which is constructed using the base unit equipped in another embodiment of the self-propelled recycling machine of the present invention.

FIG. 30 is a side view, corresponding to FIG. 17, showing an overall construction of a self-propelled granulating machine, which is constructed using the base unit 1A equipped in another embodiment of the self-propelled recycling machine of the present invention. In a self-propelled granulating machine 200E shown in FIG. 30, the transfer/delivery means 27, the granulating apparatus 37 and the receiving section 18E supported by a support frame 28E' are disposed on the base unit 1A. The loaded recyclable materials are granulated into a predetermined grain size by the granulating apparatus 37, and then delivered to the outside of the machine.

Figure 31:
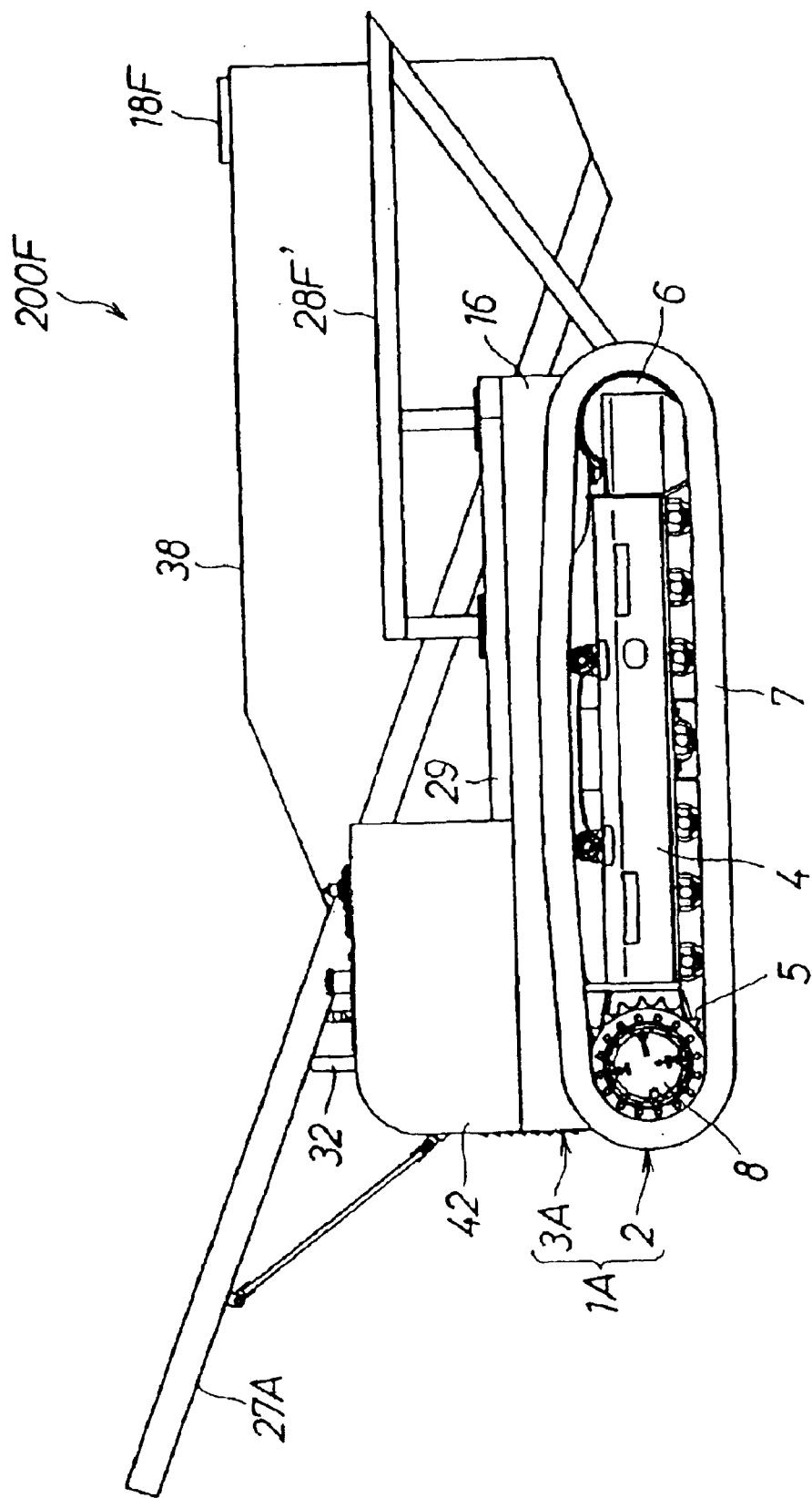
FIG. 31 is a side view, corresponding to FIG. 18, showing an overall construction of a self-propelled powder dispensing machine, which is constructed using the base unit equipped in another embodiment of the self-propelled recycling machine of the present invention.
Figure 32:
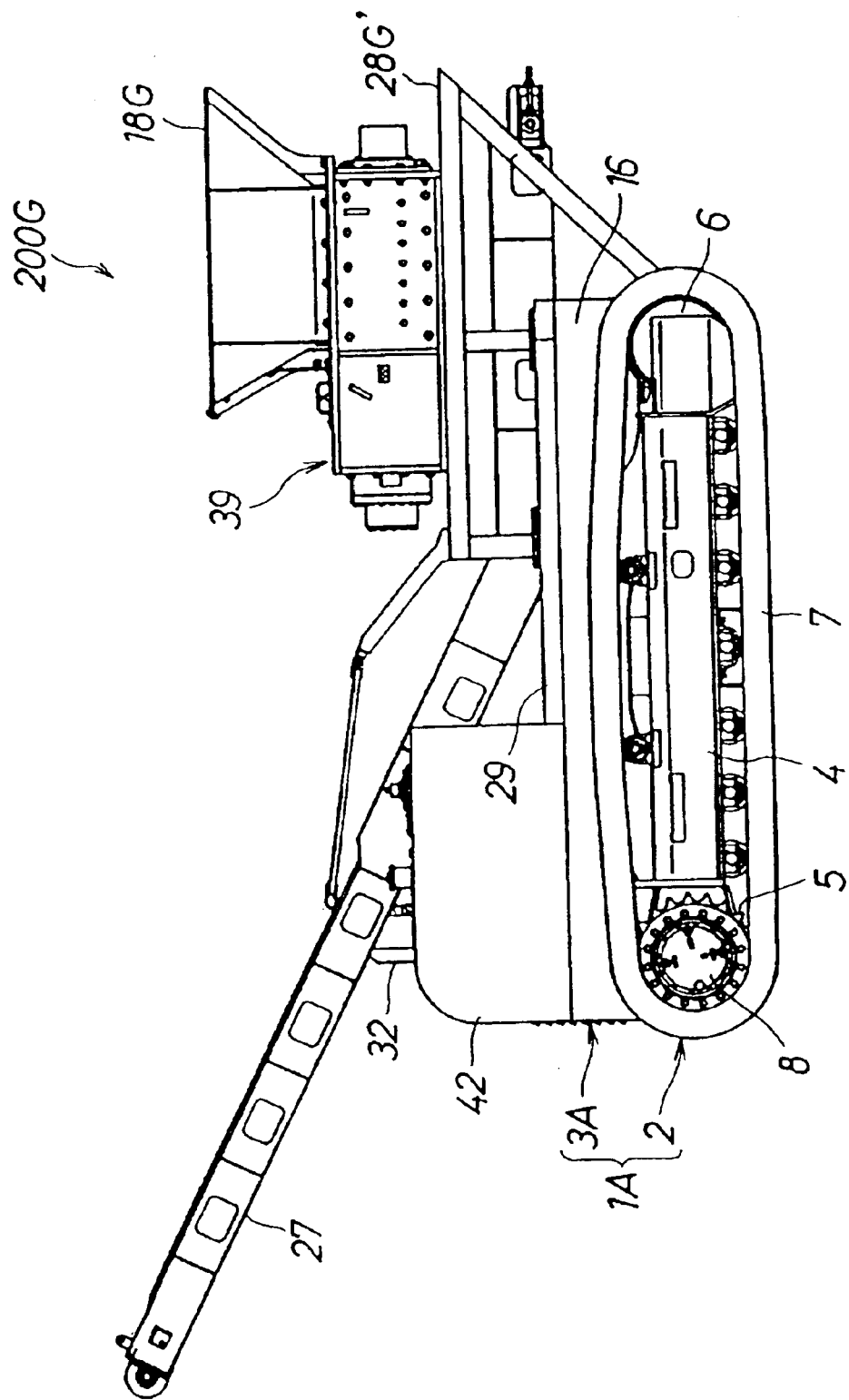
FIG. 32 is a side view, corresponding to FIG. 19, showing an overall construction of one self-propelled crushing machine, which is constructed using the base unit equipped in another embodiment of the self-propelled recycling machine of the present invention.

FIG. 31 is a side view, corresponding to FIG. 18, showing an overall construction of a self-propelled powder dispensing machine, which is constructed using the base unit 1A equipped in another embodiment of the self-propelled recycling machine of the present invention. In a self-propelled powder dispensing machine 200F shown in FIG. 31, the transfer/delivery means 27A and the reservoir 38 supported by a support frame 28F' are disposed on the base unit 1A. The powder in the reservoir 38 is delivered to the outside of the machine in a sealed-off state by the transfer/delivery means 27A, and then introduced to a receiving section of another type of self-propelled recycling machine, e.g., a self-propelled mixing machine. FIG. 32 is a side view, corresponding to FIG. 19, showing an overall construction of one self-propelled crushing machine, which is constructed using the base unit 1A equipped in another embodiment of the self-propelled recycling machine of the present invention. In a self-propelled crushing machine 200G shown in FIG. 32, the transfer/delivery means 27, the receiving section 18G and the crushing apparatus 39 supported by a support frame 28G' are disposed on the base unit 1A. The loaded recyclable materials are shorn and crushed by the crushing apparatus 39, and then delivered to the outside of the machine.

Figure 33:
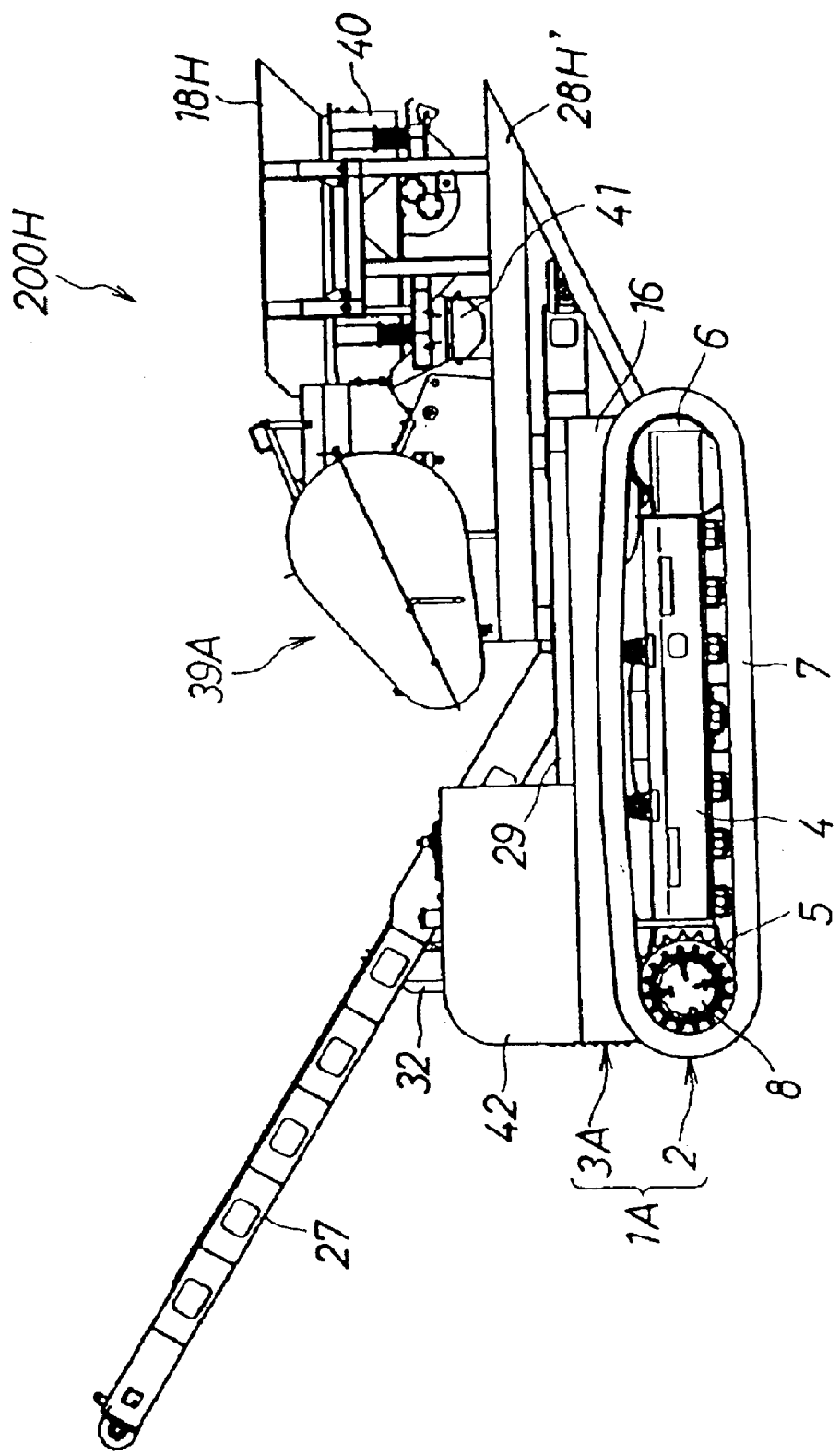
FIG. 33 is a side view, corresponding to FIG. 20, showing an overall construction of another self-propelled crushing machine, which is constructed using the base unit equipped in another embodiment of the self-propelled recycling machine of the present invention.

FIG. 33 is a side view, corresponding to FIG. 20, showing an overall construction of another self-propelled crushing machine, which is constructed using the base unit 1A equipped in another embodiment of the self-propelled recycling machine of the present invention. In a self-propelled crushing machine 200H shown in FIG. 33, the transfer/delivery means 27, the receiving section 18H, the crushing apparatus 39A, the grizzly feeder 40, the chute 41, etc. supported by a support frame 28H' are disposed on the base unit 1A. The loaded recyclable materials are crushed by the crushing apparatus 39A and delivered to the outside of the machine along with small grains introduced through the chute 41.

As seen from the above description with reference to FIGS. 26 to 33, the base unit 1A can also be employed in common in the various types of self-propelled recycling machines, and the various component units mounted on the base unit 1A can be easily replaced as attachments while the base unit 1A is used as a common base structure.

Figure 34:
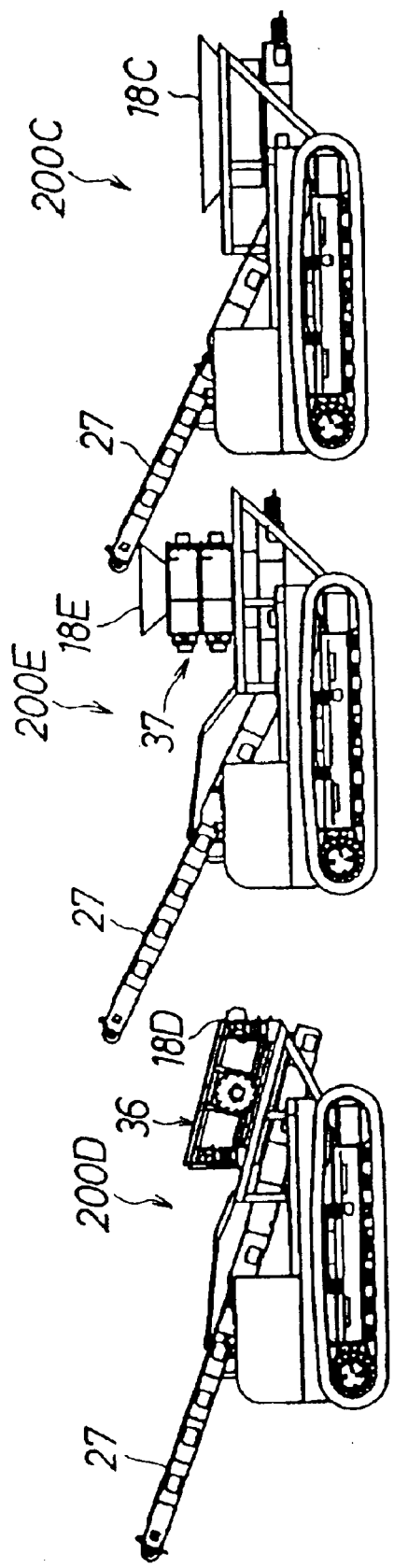
FIG. 34 is a side view of a recyclable-material processing system constructed by arranging the self-propelled supplying machine, the self-propelled granulating machine and the self-propelled sorting machine in tandem, which are each constructed using the base unit equipped in another embodiment of the self-propelled recycling machine of the present invention.
Figure 35:
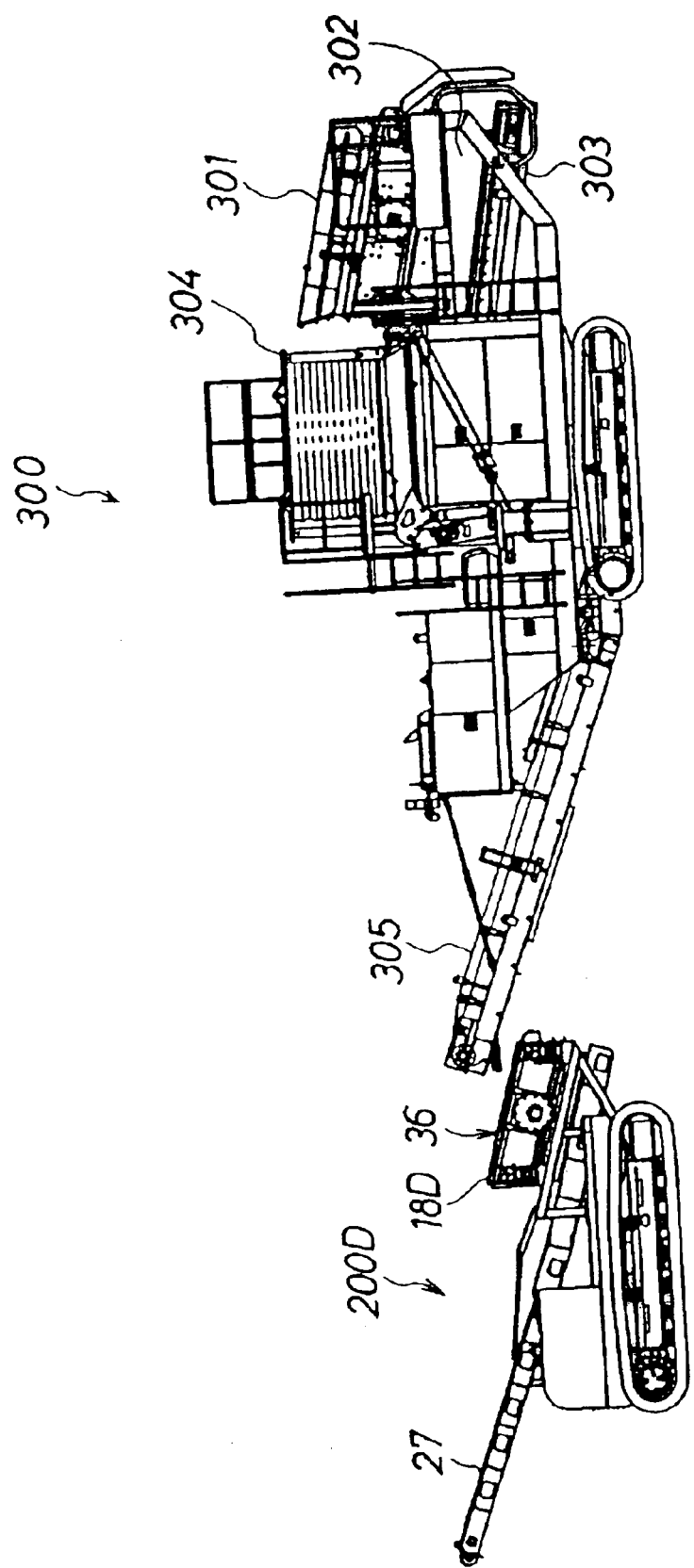
FIG. 35 is a side view of a recyclable-material processing system constructed by arranging the self-propelled sorting machine, which is constructed using the base unit equipped in another embodiment of the self-propelled recycling machine of the present invention, and a conventional self-propelled soil modifying machine in tandem.

Moreover, also in this embodiment, since the delivery height of the transfer/delivery means is set higher than the receiving section, a desired processing system can be constructed by properly arranging the various types of self-propelled recycling machines in tandem, for example, as shown in FIGS. 34 and 35. Recyclable-material processing systems shown in FIGS. 34 and 35 will be described below in brief.

In the processing system shown in FIG. 34, the self-propelled supplying machine 200C, the self-propelled granulating machine 200E and the self-propelled sorting machine 200D, all described above, are arranged in tandem in this order. Earth and sand, etc. having a high water content, such as the so-called dehydrated cake, are loaded into the receiving section 18C of the self-propelled supplying machine 200C using a hydraulic excavator, for example, and then supplied to the self-propelled granulating machine 200E in predetermined amount. The earth and sand, etc. granulated substantially into a predetermined grain size are sorted by the self-propelled sorting machine 200D. Finally, the earth and sand granulated into a desired grain size are accumulated.

The processing system shown in FIG. 35 is a soil modifying system comprising a conventional self-propelled soil modifying machine 300 and the above-described self-propelled sorting machine 200D, which are arranged in tandem. In this soil modifying system, when earth and sand are loaded as the recyclable materials into a sieving apparatus 301 of the self-propelled soil modifying machine 300 using a hydraulic excavator, for example, the earth and sand having passed through a screen (not shown) within the sieving apparatus 301 is introduced to a hopper 302 disposed under the sieving apparatus 301. The earth and sand introduced to the hopper 302 are placed on a transport conveyor 303 disposed under the hopper 302, and then introduced to a mixing apparatus (not shown) while a hardener from a hardener supplying apparatus 304 is added to the earth and sand during the transport. The earth and sand and the hardener introduced to the mixing apparatus are evenly agitated and mixed by a paddle mixer (not shown), and then supplied as modified earth, i.e., recycled products, to the sieving apparatus 36 of the self-propelled sorting machine 200D by a delivery conveyor 305. Finally, only the modified earth having grain sizes not greater than a predetermined value is sorted out by the sieving apparatus 36 and then accumulated.

Thus, since the delivery height of the transfer/delivery means is set higher than the receiving section, the materials delivered by the transfer/delivery means can be easily introduced to the receiving section of another self-propelled recycling machine. Therefore, a recyclable-material processing system capable of realizing the objective processing and having mobility can be easily constructed in a compact structure by properly arranging various types of self-propelled recycling machines having desired functions in tandem.

While the self-propelled crushing machine has been described above in connection with several examples in which crushing apparatuses such as the so-called shredder and jaw crusher are mounted on the machines, the present invention is not limited to those types of self-propelled recycling machines. The present invention is also applicable to the so-called self-propelled wood crushing machine for receiving, wood to be crushed as recyclable materials, crushing the received wood, and producing wood fragments as recycled materials, the wood to be crushed being, e.g., pruned branches and lumber from thinning which are generated when cutting trees in forests and pruning the trees, limb and twig cuttings which are generated when turning the land into a housing site and when maintaining and managing green zones, or scrap wood that is generated when dismantling wooden houses. It is needles to say that, such a wood crushing machine can also be constructed by providing, as attachments, necessary component units, e.g., a receiving section, a wood crushing apparatus and a transfer/delivery means, on the base frame 1 or 1A while supporting them by a support frame. As a matter of course, other various types of self-propelled recycling machines can also be easily constructed by providing, on the base unit 1 or 1A, other suitable processing apparatuses such as other types of crushing apparatuses, e.g., a cone crusher and an impact crusher, and a fluidizing treatment apparatus for treating sludge. Those self-propelled recycling machine can likewise provide similar advantages to those described above.

Finally, the above description has been made of, by way of example, the self-propelled recycling machine including the crawlers 7 serving as the traveling units 2 for the base unit 1 or 1A. However, the present invention is not limited to those traveling units, and the self-propelled recycling machine may include, e.g., wheel type traveling units. This type of self-propelled recycling machine can also provide similar advantages to those described above.

Industrial Applicability

According to the present invention, an accommodation space is formed between the traveling units disposed side by side in a spaced relation, and the base frame containing the power unit therein is disposed in the accommodation space, whereby the power unit, which has been disposed on the body frame in the past, is disposed between the traveling units. Accordingly, a wide space can be surely left on the base frame, and stability of the machine as a whole can be drastically improved. As a result, comparing with the conventional structure in which the body frame is disposed on the traveling units and the power unit is arranged in one side of the body frame in the longitudinal direction thereof, flexibility in layout of various component units can be greatly increased.

What is claimed is:

1. A self-propelled recycling machine for receiving recyclable materials and processing the recyclable materials to produce recycled products, said self-propelled recycling machine comprising:
   a base frame having a space therein;
   traveling units disposed on both sides of said base frame;
   a power unit comprising an engine, a fuel tank for said engine, a hydraulic fluid tank, a hydraulic pump driven by said engine, and a radiator for cooling said engine and accommodated in said space within said base frame, said space being formed between said traveling units substantially over an entire length in the longitudinal direction thereof;
   a processing apparatus disposed on said base frame;
   transfer/delivery means extended from a position under said processing apparatus toward one side of said base frame in the longitudinal direction thereof and inclined upward in a feed direction; and
   a receiving section receiving the recyclable materials and disposed above the other side of said base frame in the longitudinal direction thereof.

2. A self-propelled recycling machine according to claim 1, wherein said base frame comprises a first member having said space therein and second members disposed at an upper end of said first member on both sides to extend substantially horizontally.

3. A self-propelled recycling machine according to claim 1, wherein said transfer/delivery means has a delivery side end positioned at a level higher than said receiving section.

4. A self-propelled recycling machine according to claim 1, wherein said processing apparatus is a mixing apparatus for mixing the recyclable materials.

5. A self-propelled recycling machine according to claim 4, further comprising a transport conveyor for supplying the recyclable materials to said mixing apparatus and a hardener supplying apparatus for supplying a hardener to the recyclable materials, disposed on said base frame.

6. A self-propelled recycling machine according to claim 1, further comprising an amount-of-dispensed-material adjusting means disposed above said transfer/delivery means, for adjusting an amount of the recyclable materials dispensed to be transported by said transfer/delivery means.

7. A self-propelled recycling machine according to claim 1, wherein said processing apparatus is a sieving apparatus for sorting the recyclable materials depending on grain size.

8. A self-propelled recycling machine according to claim 1, wherein said processing apparatus comprises a compressive kneading apparatus for compressing and kneading the recyclable materials, and a disintergrating apparatus for shearing the recyclable materials having been compressed and kneaded by said compressive kneading apparatus.

9. A self-propelled recycling machine according to claim 1, wherein said processing apparatus is a crushing apparatus for crushing the recyclable materials.

10. A self-propelled recycling machine for receiving recyclable materials and processing the recyclable materials to produce recycled products, said self-propelled recycling machine comprising:

a base frame having a space therein;

traveling units disposed on both sides of said base frame;

a power unit comprising an engine, a fuel tank for said engine, a hydraulic fluid tank, a hydraulic pump driven by said engine, and a radiator for cooling said engine, at least said engine, said hydraulic pump, and said radiator being arranged in said space within said base frame, said space being formed on one side of said traveling units in the longitudinal direction thereof;

a processing apparatus disposed on said base frame;

transfer/delivery means extended from a position under said processing apparatus toward one side of said base frame in the longitudinal direction thereof and inclined upward in a feed direction; and a receiving section receiving the recyclable materials and disposed above the other side of said base frame in the longitudinal direction thereof.

11. A self-propelled recycling machine according to claim 10, wherein said base frame comprises a first member having said space therein and second members disposed at an upper end of said first member on both sides to extend substantially horizontally.

12. A self-propelled recycling machine according to claim 10, wherein said transfer/delivery means has a delivery side end positioned at a level higher than said receiving section.

13. A self-propelled recycling machine according to claim 10, wherein said processing apparatus is a mixing apparatus for mixing the recyclable materials.

14. A self-propelled recycling machine according to claim 13, further comprising a transport conveyor for supplying the recyclable materials to said mixing apparatus and a hardener supplying apparatus for supplying a hardener to the recyclable materials, disposed on said base frame.

15. A self-propelled recycling machine according to claim 10, further comprising an amount-of-dispensed-material adjusting means disposed above said transfer/delivery means, for adjusting an amount of the recyclable materials dispensed to be transported by said transfer/delivery means.

16. A self-propelled recycling machine according to claim 10, wherein said processing apparatus is a sieving apparatus for sorting the recyclable materials depending on grain size.

17. A self-propelled recycling machine according to claim 10, wherein said processing apparatus comprises a compressive kneading apparatus for compressing and kneading the recyclable materials, and a disintergrating apparatus for shearing the recyclable materials having been compressed and kneaded by said compressive kneading apparatus.

18. A self-propelled recycling machine according to claim 10, wherein said processing apparatus is a crushing apparatus for crushing the recyclable materials.

* * * * *